US012573002B2

(12) United States Patent (10) Patent No.: US 12,573,002 B2
Wu et al. (45) Date of Patent: Mar. 10, 2026

(54) IMAGE FUSION METHOD AND APPARATUS AND TRAINING METHOD AND APPARATUS FOR IMAGE FUSION MODEL

(71) Applicant: HUAWEI TECHNOLOGIES CO., LTD., Shenzhen (CN)

(72) Inventors: Huazhen Wu, Hangzhou (CN); Tingting Xu, Shenzhen (CN); Zhijuan Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 481 days.

(21) Appl. No.: 18/176,240

(22) Filed: Feb. 28, 2023

(65) Prior Publication Data

US 2023/0214976 A1 Jul. 6, 2023

Related U.S. Application Data

(63) Continuation of application No. PCT/CN2021/104634, filed on Jul. 6, 2021.

(30) Foreign Application Priority Data

Aug. 31, 2020 (CN) .......................... 202010901107.9

(51) Int. Cl.
<table>
<tr><td>*G06T 5/50*</td><td>(2006.01)</td></tr>
<tr><td>*G06T 5/00*</td><td>(2024.01)</td></tr>
<tr><td>*G06T 5/70*</td><td>(2024.01)</td></tr>
</table>

(52) U.S. Cl.
CPC .................. *G06T 5/50* (2013.01); *G06T 5/70* (2024.01); *G06T 2207/10024* (2013.01);
(Continued)

(58) Field of Classification Search
CPC ... G06T 5/50; G06T 5/70; G06T 2207/10024; G06T 2207/10048; G06T 2207/20081; G06T 2207/20084; G06T 2207/20221
See application file for complete search history.

(56) References Cited

U.S. PATENT DOCUMENTS 9,299,130 B2 * 3/2016 Panetta ...................... G06T 5/50
9,369,612 B2 * 6/2016 Oh .......................... H04N 23/11
(Continued)

FOREIGN PATENT DOCUMENTS

CN 108875669 A 11/2018
CN 110827375 A 2/2020

OTHER PUBLICATIONS

Xu Dongdong, "Research on Infrared and visible image Fusion based on unsupervised deep Learning," University of Chinese Academy of Sciences, Total 44 pages (Jun. 2020).
(Continued)

*Primary Examiner* — Gregory M Desire
(74) *Attorney, Agent, or Firm* — Leydig, Voit & Mayer, Ltd.

(57) ABSTRACT

An image fusion method and apparatus and a training method and apparatus for an image fusion model are provided, which relate to the field of artificial intelligence, and specifically, to the field of computer vision. The image fusion method includes: obtaining a to-be-processed color image, an infrared image, and a background reference image, where the infrared image and the to-be-processed color image are shot for a same scene; and inputting the to-be-processed color image, the infrared image, and the background reference image into an image fusion model for feature extraction, and performing image fusion based on extracted features to obtain a fused image. This method can improve image quality of a fused image, and also ensure accurate and natural color of the fused image.

18 Claims, 16 Drawing Sheets

(52) U.S. Cl.
    CPC .............. *G06T 2207/10048* (2013.01); *G06T 2207/20081* (2013.01); *G06T 2207/20084* (2013.01); *G06T 2207/20221* (2013.01)

(56) References Cited

U.S. PATENT DOCUMENTS

| | | | | |
|---|---|---|---|---|
| 9,996,913 | B2 * | 6/2018 | Beck ..................... | G06T 3/4061 |
| 10,341,586 | B2 * | 7/2019 | Huang ................... | H04N 23/55 |
| 10,803,559 | B2 * | 10/2020 | Strandemar .............. | G06T 5/73 |
| 10,958,874 | B2 * | 3/2021 | Astarabadi ............ | H04N 7/147 |
| 11,298,017 | B2 * | 4/2022 | Tran ....................... | A61B 3/107 |
| 11,328,188 | B2 * | 5/2022 | Weng .................... | H04N 23/45 |
| 11,328,397 | B2 * | 5/2022 | Luo ......................... | H04N 23/85 |
| 11,354,827 | B2 * | 6/2022 | Lu .......................... | H04N 23/84 |
| 11,388,355 | B2 * | 7/2022 | Hayes ...................... | G06T 7/10 |
| 11,514,563 | B2 * | 11/2022 | Strandemar ............ | H04N 23/20 |

OTHER PUBLICATIONS

Xie et al., "Infrared and Visible Image Fusion: A Region-Based Deep Learning Method," Advance in Databases and Information Systems, Springer International Publishing, XP047516176, total 12 pages (Aug. 6, 2019).

Xiao et al., "Improved Dynamic Image Fusion Scheme for Infrared and Visible Sequence Based on Image Fusion System," XP031932058, total 6 pages, Institute of Electrical and Electronics Engineers, New York, New York (Jun. 30, 2008).

* cited by examiner (a)

(b)

(a)

(b)

(c)

(d)

(e)

(f)

(a)

(b)

(a)

(b)

<u>1100</u>
Obtain a to-be-processed color image, an infrared image, and a background reference image ⏤ S1110
Input the to-be-processed color image, the infrared image, and the background reference image into a trained image fusion model for feature extraction, and perform image fusion based on extracted features to obtain a fused image ⏤ S1120
FIG. 16
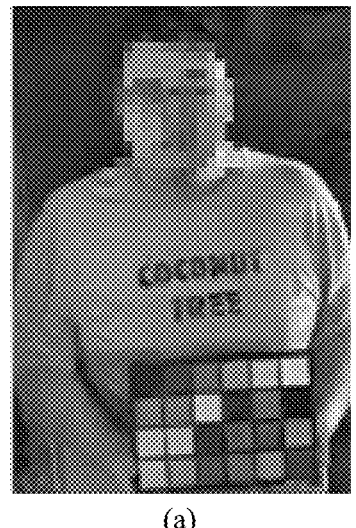
(a)                    (b)                    (c)
FIG. 17

(a)

(b)

(c)

(a)      (b)      (c)

IMAGE FUSION METHOD AND APPARATUS AND TRAINING METHOD AND APPARATUS FOR IMAGE FUSION MODEL

CROSS-REFERENCE TO RELATED APPLICATIONS

This application is a continuation of International Application No. PCT/CN2021/104634, filed on Jul. 6, 2021, which claims priority to Chinese Patent Application No. 202010901107.9, filed on Aug. 31, 2020. The disclosures of the aforementioned applications are hereby incorporated by reference in their entireties.

TECHNICAL FIELD

Embodiments of this application relate to the field of computer vision, and in particular, to an image fusion method and apparatus and a training method and apparatus for an image fusion model.

BACKGROUND

Computer vision is an integral part of various intelligent/autonomic systems in various application fields, for example, manufacturing industry, inspection, document analysis, medical diagnosis, and military affairs. The computer vision is knowledge about how to use a camera/video camera and a computer to obtain required data and information of a photographed subject. To be vivid, eyes (the camera/video camera) and a brain (an algorithm) are installed on the computer to replace human eyes to recognize, track, and measure an object, and the like, so that the computer can perceive an environment. Perceiving may be considered as extracting information from a perceptual signal. Therefore, computer vision may also be considered as a science of studying how to make an artificial system perceive an image or multi-dimensional data. In conclusion, the computer vision is to replace a visual organ with various imaging systems to obtain input information, and then replace a brain with a computer to process and interpret the input information. A final study objective of computer vision is to enable a computer to observe and understand the world through vision in a way that human beings do, and have a capability of automatically adapting to an environment.

Imaging quality has a significant impact on an image processing effect. With the development of imaging technologies, a current shooting device can obtain a good imaging result when illumination is high, for example, in an ideal case of daytime. However, in a low-illumination scene, for example, a rainy weather or a night scene, a shot image or video has problems such as low resolution, poor contrast, and image detail loss. A current device usually uses a near-infrared fill-in light manner to improve imaging quality in the low-illumination scene. However, due to an imaging feature of the device, an infrared image cannot reproduce real color of an object.

Because a color image and an infrared image are complementary to each other, a fused image can be obtained by fusing the color image and the infrared image, to improve imaging quality. However, a current fusion method cannot ensure a fusion effect, and a large quantity of details are lost in an output image, affecting quality of the output image.

Therefore, how to improve quality of a fused image becomes an urgent problem to be resolved.

SUMMARY

This application provides an image fusion method and apparatus and a training method and apparatus for an image fusion model, so that a fused image can include more image details, quality of the fused image can be improved, and accurate and natural color of the fused image can be ensured.

According to a first aspect, an image fusion method is provided. The method includes: obtaining a to-be-processed color image, an infrared image, and a background reference image, where the infrared image and the to-be-processed color image are shot for a same scene, and the same scene means that a similarity between the to-be-processed color image and the infrared image is greater than a first threshold; and the to-be-processed color image is an image formed by reflection of visible light by the scene, and the infrared image is an image formed by reflection of light in an infrared band by the scene; and inputting the to-be-processed color image, the infrared image, and the background reference image into a trained image fusion model for feature extraction, and performing image fusion based on extracted features to obtain a fused image, where a similarity between the background reference image and the to-be-processed color image is greater than a second threshold.

According to the solution in embodiments of this application, a color image has rich color information, an infrared image has more texture information, and a fused image obtained by fusing the color image and the infrared image has natural color and rich texture information, thereby significantly improving foreground quality of the fused image. A background reference image is added, so that a background blur problem that may be caused by a flashlight effect of an infrared image can be resolved, and background quality of an output image can be greatly improved, that is, quality of a foreground area and quality of a background area in the output image are both enhanced, thereby implementing full-picture image enhancement.

The similarity in embodiments of this application may be an image texture similarity. For example, the similarity between the to-be-processed color image and the infrared image may be an image texture similarity between the to-be-processed color image and the infrared image. The similarity between the background reference image and the to-be-processed color image may be an image texture similarity between the background reference image and the to-be-processed color image.

A background area in the background reference image is the same as a background area in the to-be-processed color image. That the similarity between the background reference image and the to-be-processed color image is greater than a second threshold may be that a similarity between the background area in the background reference image and the background area in the to-be-processed color image is greater than the second threshold. The background area may be determined by using the prior art. This is not limited in embodiments of this application.

The "shot for a same scene" may be understood as that the infrared image and the to-be-processed color image have same picture content. For example, the infrared image may be an infrared image shot in a same region at a same moment as the to-be-processed color image.

The background reference image may be inputted into the image fusion model in a form of a color image, or may be inputted into the image fusion model in a form of a grayscale image.

With reference to the first aspect, in some embodiments of the first aspect, the method further includes: obtaining a fusion weight, and inputting the fusion weight into the image fusion model, where the fusion weight is for weighting the to-be-processed color image and the infrared image.

In other words, the fusion weight is for adjusting a fusion ratio of the to-be-processed color image and the infrared image in the fused image.

According to the solution in embodiments of this application, a fused image obtained by performing fusion using a same image fusion model cannot satisfy fusion requirements of different application scenarios. A fusion ratio of a color image and an infrared image can be adjusted by introducing a fusion weight, thereby facilitating application to different application scenarios. In other words, it is not necessary to separately train a plurality of image fusion models for different application scenarios, and one image fusion model can be applied to different scenarios only by adjusting a fusion weight, thereby improving freedom of using the model.

With reference to the first aspect, in some embodiments of the first aspect, the fusion weight corresponds to a part or all of the fused image.

That the fusion weight corresponds to all of the fused image may be understood as that only one fusion weight is used in the entire fused image. The fusion ratio of the to-be-processed color image and the infrared image is the same in any area in the fused image.

That the fusion weight corresponds to a part of the fused image may be understood as that the fusion weight corresponds to one area in the fused image. In this case, a plurality of fusion weights may be used, and the plurality of fusion weights respectively correspond to different areas in the fused image.

According to the solution in embodiments of this application, different areas correspond to different fusion weights, to satisfy image fusion requirements of different areas in a same image, thereby helping improve image quality of an output image.

With reference to the first aspect, in some embodiments of the first aspect, the fusion weight is greater than or equal to 0 and less than or equal to 1, and a proportion of the infrared image in the fused image is in a positive correlation with the fusion weight.

When the fusion weight is larger, the proportion of the infrared image in the fused image is larger, that is, more infrared information is fused in the fused image.

With reference to the first aspect, in some embodiments of the first aspect, the to-be-processed color image includes N frames of color images, the infrared image includes N frames of infrared images corresponding to the N frames of color images, background reference images corresponding to the N frames of color images are determined based on background reference images of M frames of color images in the N frames of color images, M is a positive integer, N is a positive integer greater than 1, and N>M.

For example, this method may be used to perform image fusion on any frame of color image and infrared image in a video.

For example, the N frames of infrared images corresponding to the N frames of color images may be obtained when a same region is shot at a same moment as the N frames of color images. In other words, the N frames of color images are in a one-to-one correspondence with the N frames of infrared images.

According to the solution in embodiments of this application, a feature of a background reference image of a previous frame is reused, and it is not necessary to extract a feature of a background reference image in each fusion process. Therefore, a calculation amount is reduced, hardware overheads can be reduced while imaging quality is ensured, and image fusion can still be implemented when computing resources of a device are limited.

With reference to the first aspect, in some embodiments of the first aspect, features of the N frames of color images and features of the N frames of infrared images are separately extracted; features of M background reference images corresponding to the M frames of color images are separately extracted; and N fused images are separately reconstructed based on the features of the N frames of color images, the features of the N frames of infrared images, and the features of the M background reference images.

For example, the N frames of color images and the N frames of infrared images may be simultaneously inputted into the image fusion model. In this way, the features of the N frames of color images and the features of the N frames of infrared images can be simultaneously extracted, thereby further improving a processing speed.

It should be understood that the N frames of color images and the N frames of infrared images may alternatively be sequentially inputted into the image fusion model, to sequentially extract the features of the N frames of color images and the features of the N frames of infrared images.

According to the solution in embodiments of this application, a plurality of frames of images are fused at the same time, thereby improving a processing speed, and a feature of the background reference image is reused, thereby reducing a calculation amount in a process of extracting the feature of the background reference image, and reducing hardware overheads.

With reference to the first aspect, in some embodiments of the first aspect, the background reference image is obtained in any one of the following manners: obtaining the background reference image based on a plurality of frames preceding the to-be-processed color image; using a long exposure frame preceding the to-be-processed color image as the background reference image, where the long exposure frame is a frame obtained when exposure duration is greater than a third threshold; using a result obtained after temporal noise reduction is performed on the to-be-processed color image as the background reference image; or using a fused image of frames preceding the to-be-processed color image as the background reference image.

With reference to the first aspect, in some embodiments of the first aspect, the trained image fusion model is obtained by training an image fusion model using a first color image and a first infrared image as inputs of the image fusion model and using a target that a value of a loss function is less than a fourth threshold; and the loss function includes a first loss function, the first loss function is for indicating a difference between an image outputted by the image fusion model and a target fused image, the target fused image is determined based on a target color image and a target infrared image, the first color image, the first infrared image, the target color image, and the target infrared image are shot for the same scene, the same scene means that a similarity between any two of the first color image, the first infrared image, the target color image, and the target infrared image is greater than the first threshold, a signal-to-noise ratio of the target color image is greater than a signal-to-noise ratio of the first color image, and a signal-to-noise ratio of the target infrared image is greater than a signal-to-noise ratio of the first infrared image.

According to the solution in embodiments of this application, the target fused image is determined by using the target color image and the target infrared image, and the image fusion model is trained based on the target fused image, so that the image fusion model can fully use infrared information. This helps fuse more texture information in the output image and retain more image details.

With reference to the first aspect, in some embodiments of the first aspect, the loss function further includes a second loss function, and the second loss function is for indicating a difference between the target color image and the image outputted by the image fusion model.

According to the solution in embodiments of this application, the image outputted by the loss-constrained image fusion model is similar to the target color image as much as possible. This can ensure a noise reduction effect and ensure that color of the output image is consistent with that of the target color image, thereby avoiding a problem that the color of the output image is incorrect. In addition, a noise reduction task and a fusion task are executed collaboratively, thereby reducing an information loss. This can ensure that rich texture details are retained in the fused image and ensure that the fused image reaches high resolution and real color information.

With reference to the first aspect, in some embodiments of the first aspect, the target fused image is an image of a luminance channel, and the difference between the image outputted by the image fusion model and the target fused image is a difference between a luminance channel of the image outputted by the image fusion model and the target fused image.

According to the solution in embodiments of this application, training is performed at a luminance channel layer, to help fuse more texture features and reduce impact of another factor on an image fusion process.

According to a second aspect, a training method for an image fusion model is provided. The training method includes: obtaining at least one training sample, where the training sample includes a first color image, a first infrared image, a target color image, and a target infrared image, the first color image, the first infrared image, the target color image, and the target infrared image are shot for a same scene, the same scene means that a similarity between any two of the first color image, the first infrared image, the target color image, and the target infrared image is greater than a first threshold, the first color image and the target color image are images formed by reflection of visible light by the scene, and the first infrared image and the target infrared image are images formed by reflection of light in an infrared band by the scene; and a signal-to-noise ratio of the target color image is greater than a signal-to-noise ratio of the first color image, and a signal-to-noise ratio of the target infrared image is greater than a signal-to-noise ratio of the first infrared image; and training an image fusion model using the first color image and the first infrared image as inputs of the image fusion model and using a target that a value of a loss function is less than a fourth threshold, to obtain a trained image fusion model, where the loss function includes a first loss function, the first loss function is for indicating a difference between an image outputted by the image fusion model and a target fused image, and the target fused image is determined based on the target color image and the target infrared image.

The color image may also be referred to as a visible light image.

The first color image is in a one-to-one correspondence with the first infrared image. For example, the first infrared image may be an infrared image shot at a same moment as the first color image.

The target color image is in a one-to-one correspondence with the target infrared image. For example, the target infrared image is an infrared image that is at a same moment as the target color image.

The "shot for a same scene" may be understood as that the images have the same picture content, for example, a same scene shot at a same location.

The similarity in embodiments of this application may be an image texture similarity. For example, the similarity between any two of the first color image, the first infrared image, the target color image, and the target infrared image may be an image texture similarity between any two of the first color image, the first infrared image, the target color image, and the target infrared image.

In the solution in embodiments of this application, a color image has rich color information, an infrared image has more texture information, and a fused image obtained by fusing the color image and the infrared image has natural color and rich texture information. The target fused image is determined according to the target color image and the target infrared image, and the image fusion model is trained based on the target fused image, so that the image fusion model can fully use infrared information. This helps fuse more texture information in the output image and retain more image details.

With reference to the second aspect, in some embodiments of the second aspect, the training an image fusion model using the first color image and the first infrared image as inputs of the image fusion model and using a target that a value of a loss function is less than a fourth threshold, to obtain a trained image fusion model includes: training the image fusion model using a first fusion weight, the first color image, and the first infrared image as inputs of the image fusion model and using the target that the value of the loss function is less than the fourth threshold, to obtain the trained image fusion model, where the first fusion weight is for weighting the first color image and the first infrared image, and the target fused image is determined based on the first fusion weight, the target color image, and the target infrared image.

In other words, the first fusion weight is for adjusting a fusion ratio of the first color image and the first infrared image in the image outputted by the image fusion model.

Optionally, the determining the target fused image based on the first fusion weight, the target color image, and the target infrared image includes: determining a supervised image based on the target color image and the target infrared image, and weighting the supervised image and the target color image based on the first fusion weight.

In other words, a ratio of the supervised image and the target color image in the target fused image is adjusted based on the first fusion weight.

According to the solution in embodiments of this application, a fused image obtained by performing fusion using a same image fusion model cannot satisfy fusion requirements of different application scenarios. A fusion ratio of a color image and an infrared image can be adjusted by introducing a fusion weight, thereby facilitating application to different application scenarios. In other words, it is not necessary to separately train a plurality of image fusion models for different application scenarios, and one image fusion model can be applied to different scenarios only by adjusting a fusion weight, thereby improving freedom of using the model.

With reference to the second aspect, in some embodiments of the second aspect, the first fusion weight corresponds to a part or all of the image outputted by the image fusion model.

That the first fusion weight corresponds to all of the image outputted by the image fusion model may be understood as that only one first fusion weight is used in the entire image outputted by the image fusion model. In any area of the image outputted by the image fusion model, a fusion ratio of the first color image and the first infrared image is the same.

That the first fusion weight corresponds to a part of the image outputted by the image fusion model may be understood as that the first fusion weight corresponds to one area in the image outputted by the image fusion model. In this case, a plurality of first fusion weights may be used, and the plurality of first fusion weights respectively correspond to different areas in the image outputted by the image fusion model. The first fusion weight may be understood as a local weight. The local weight is for indicating a fusion weight of a local area in an image fusion process. In the fusion process, different first fusion weights may be used for different areas.

In embodiments of this application, different areas correspond to different fusion weights, to satisfy image fusion requirements of different areas in a same image, thereby helping improve image quality of an output image.

The first fusion weight may be inputted into the image fusion model in a form of a parameter, or may be inputted into the image fusion model in a form of a fusion weight map. This is not limited in this application.

The first fusion weight is represented in a form of a fusion weight map, so that complexity of adjusting the first fusion weight can be reduced. When a plurality of first fusion weights are used, it is more helpful to represent, by using the fusion weight map, an area corresponding to the first fusion weight. Especially when the area corresponding to the first fusion weight is of an irregular shape, a form of the fusion weight map is more conducive to representing the area corresponding to the first fusion weight.

With reference to the second aspect, in some embodiments of the second aspect, the training an image fusion model using the first color image and the first infrared image as inputs of the image fusion model and using a target that a value of a loss function is less than a fourth threshold, to obtain a trained image fusion model includes: training the image fusion model using a first background reference image, the first color image, and the first infrared image as inputs of the image fusion model and using the target that the value of the loss function is less than the fourth threshold, to obtain the trained image fusion model, where a similarity between the first background reference image and the first color image is greater than a second threshold.

A background area in the first background reference image is the same as a background area in the first color image. That the similarity between the first background reference image and the first color image is greater than a second threshold may be that a similarity between the background area in the first background reference image and the background area in the first color image is greater than the second threshold. The background area may be determined by using the prior art. This is not limited in embodiments of this application.

For example, the first background reference image may be inputted into the image fusion model in a form of a color image, or may be inputted into the image fusion model in a form of a grayscale image.

According to the solution in embodiments of this application, the background reference image is added as an input of the image fusion model, and the image fusion model is trained based on the background reference image, so that a background blur problem that may be caused by a flashlight effect of an infrared image can be resolved, and background quality of an output image can be greatly improved, that is, both foreground area quality and background area quality of the output image are enhanced, to implement full-picture image enhancement.

With reference to the second aspect, in some embodiments of the second aspect, the loss function further includes a second loss function, and the second loss function is for indicating a difference between the target color image and the image outputted by the image fusion model.

According to the solution in embodiments of this application, the image outputted by the loss-constrained image fusion model is similar to the target color image as much as possible. This can ensure a noise reduction effect and ensure that color of the output image is consistent with that of the target color image, thereby avoiding a problem that the color of the output image is incorrect. In addition, a noise reduction task and a fusion task are executed collaboratively, thereby reducing an information loss. This can ensure that rich texture details are retained in the fused image and ensure that the fused image reaches high resolution and real color information.

With reference to the second aspect, in some embodiments of the second aspect, the target fused image is an image of a luminance channel, and the difference between the image outputted by the image fusion model and the target fused image is a difference between a luminance channel of the image outputted by the image fusion model and the target fused image.

According to the solution in embodiments of this application, training is performed at a luminance channel layer, to help fuse more texture features and reduce impact of another factor on an image fusion process.

With reference to the second aspect, in some embodiments of the second aspect, the target fused image satisfies the following formula:

$$y_{fuse\_adj} = y_{fuse} \times \text{IN\_FuseMap} + (1 - \text{IN\_FuseMap}) \times y_{gt\_Vis},$$

where yfuse_adj represents the target fused image, $y_{fuse}$ represents the fused image obtained by using a luminance channel of the target color image and a luminance channel of the target infrared image, IN_FuseMap represents a fusion weight map, $y_{gt\_Vis}$ represents the luminance channel of the target color image. Values in different areas in the fusion weight map respectively indicate weights corresponding to the different areas of the image.

According to a third aspect, an image fusion apparatus is provided. The apparatus includes modules/units configured to perform the method in any implementation of the first aspect.

According to a fourth aspect, a training apparatus for an image fusion model is provided. The apparatus includes modules/units configured to perform the method in any implementation of the second aspect.

According to a fifth aspect, an image fusion apparatus is provided. The apparatus includes: a memory, configured to store a program; and a processor, configured to execute the program stored in the memory, where when the program stored in the memory is executed, the processor is configured to perform the method in any implementation of the first aspect.

According to a sixth aspect, a training apparatus for an image fusion model is provided. The apparatus includes: a memory, configured to store a program; and a processor, configured to execute the program stored in the memory, where when the program stored in the memory is executed, the processor is configured to perform the method in any implementation of the second aspect.

According to a seventh aspect, a computer-readable medium is provided. The computer-readable medium stores program code to be executed by a device, and the program code is for performing the method in any one of the embodiments of the first aspect or the second aspect.

According to an eighth aspect, a computer program product including instructions is provided. When the computer program product runs on a computer, the computer is enabled to perform the method in any one of the embodiments of the first aspect or the second aspect.

According to a ninth aspect, a chip is provided. The chip includes a processor and a data interface. The processor performs the method in any one of the embodiments of the first aspect or the second aspect by reading, through the data interface, instructions stored in a memory.

Optionally, in an embodiment, the chip may further include the memory, and the memory stores the instructions. The processor is configured to execute the instructions stored in the memory, and when the instructions are executed, the processor is configured to perform the method in any one of the embodiments of the first aspect or the second aspect.

The foregoing chip may be specifically a field programmable gate array (FPGA) or an application-specific integrated circuit (ASIC).

According to a tenth aspect, an electronic device is provided. The electronic device includes the apparatus in any one of the embodiments of the third aspect or the fourth aspect.

BRIEF DESCRIPTION OF DRAWINGS

In the following embodiments of this application are described in more detail with reference to the accompanying drawings, in which:

FIG. 16 is a schematic flowchart of an image fusion method according to an embodiment of this application;

FIG. 17 is a schematic diagram of fused images using different fusion weights according to an embodiment of this application;

DESCRIPTION OF EMBODIMENTS

The following describes technical solutions of this application with reference to the accompanying drawings.

The image fusion method provided in embodiments of this application can be applied to video surveillance, Safe City, night shooting, and scenarios in which image quality needs to be improved. Specifically, the image fusion method in embodiments of this application can be applied to video surveillance and night shooting. The following briefly describes the video surveillance and night shooting separately.

Video Surveillance

Video surveillance is an important means of comprehensive public security and traffic supervision in cities. With development of imaging technologies, a current surveillance device can obtain a good imaging effect in an ideal daytime case. However, in some non-ideal cases, for example, in poor-illumination scenes such as rainy days or at night, acquired surveillance images have problems such as low resolution, poor contrast, and loss of image details.

According to the method provided in embodiments of this application, imaging quality of an acquired surveillance video can be significantly improved, and a definition requirement of a surveillance person for a surveillance video can be better satisfied, so that the surveillance person can view the surveillance video and obtain valuable information.

Night Shooting

When a user needs to shoot a photo or a video at night, quality of imaging at night can be improved in a manner of improving image fusion, and user experience can be improved.

According to the method in embodiments of this application, night imaging quality can be significantly improved, a requirement of a user for night shooting can be satisfied, a post-processing time of the user is reduced, and user experience is improved.

Figure 1:
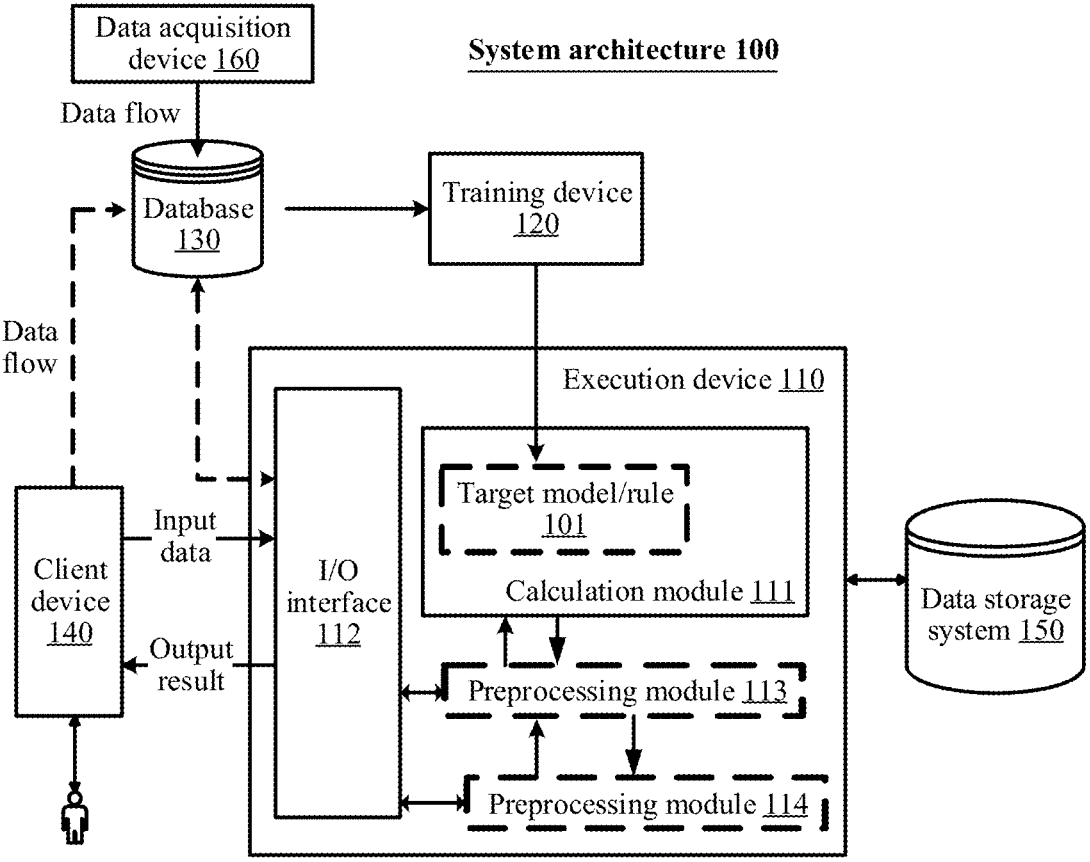
FIG. 1 is a schematic diagram of a system architecture according to an embodiment of this application.

The method and the apparatus provided in embodiments of this application may be further used to expand a training database. As shown in FIG. 1, an I/O interface 112 of an execution device 110 may send, to a database 130 as training data pairs, an image processed by the execution device (for example, a fused image) and a to-be-processed color image and an infrared image that are inputted by a user, so that the database 130 maintains richer training data, thereby providing richer training data for training work of a training device 120.

The following describes the method provided in this application from a model training side and a model application side.

The training method for an image fusion model provided in embodiments of this application relates to computer vision processing, and may be specifically applied to data processing methods such as data training, machine learning, and deep learning. Symbolic and formal intelligent information modeling, extraction, preprocessing, training, and the like are performed on training data (for example, the first color image, the target color image, the first infrared image, and the target infrared image in this application), to finally obtain a trained image fusion network. In addition, according to the image fusion method provided in embodiments of this application, input data (for example, a to-be-processed color image and an infrared image in this application) may be inputted into the trained image fusion network using the foregoing trained image fusion network, to obtain output data (for example, a fused image in this application). It should be noted that the training method for an image fusion network and the image fusion method provided in embodiments of this application are inventions generated based on a same concept, and may also be understood as two parts in a system, or two phases of an overall process, for example, a model training phase and a model application phase.

Because embodiments of this application relate to massive application of a neural network, for ease of understanding, the following first describes terms and concepts related to the neural network in embodiments of this application.

(1) Neural Network

The neural network may include a neuron. The neuron may be an operation unit that uses xs and an intercept of 1 as an (input. An output of the operation unit may be as follows:

$$h_{W,b}(x)=f(W^{T}x)=f(\Sigma_{s=1}^{n}W_{s}x_{s}+b),$$

where s=1, 2, . . . , or n, n is a natural number greater than 1, $W_{s}$ is a weight of $x_{s}$, and b is bias of the neuron. $f$ is an activation function (activation functions) of a neural unit, and is used to perform non-linear transformation on a feature obtained in the neural network, to convert an input signal in the neural unit into an output signal. The output signal of the activation function may serve as an input of a next convolution layer. The activation function may be a sigmoid function. The neural network is a network formed by connecting many single neurons together. To be specific, an output of a neuron may be an input of another neuron. An input of each neuron may be connected to a local receptive field of a previous layer to extract a feature of the local receptive field. The local receptive field may be a region including several neurons.

(2) Deep Neural Network

The deep neural network (DNN) is also referred to as a multi-layer neural network, and may be understood to be a neural network with a plurality of hidden layers. The DNN is divided based on locations of different layers, and a neural network in the DNN may be divided into three types: an input layer, a hidden layer, and an output layer. Generally, the first layer is the input layer, the last layer is the output layer, and the middle layer is the hidden layer. Layers are fully connected. To be specific, any neuron in an $i^{th}$ layer is definitely connected to any neuron in an $(i+1)^{th}$ layer.

Although the DNN seems complex, it is not complex in terms of work at each layer. Simply speaking, the DNN is the following linear relationship expression: $\vec{y}=\alpha(W\vec{x}+\vec{b})$, where $\vec{x}$ is an input vector, $\vec{y}$ is an output vector, $\vec{b}$ is an offset vector, W is a weight matrix (also referred to as a coefficient), and $\alpha(\ )$ is an activation function. At each layer, the output vector $\vec{y}$ is obtained by performing such a simple operation on the input vector $\vec{x}$. Because a large quantity of DNN layers are used, a large quantity of coefficients W and offset vectors $\vec{b}$ are used. Definitions of these parameters in the DNN are as follows: The coefficient W is used as an example. It is assumed that in a three-layer DNN, a linear coefficient from the fourth neuron at the second layer to the second neuron at the third layer is defined as $W_{24}^{3}$. The superscript 3 represents a layer at which the coefficient W is located, and the subscript corresponds to an output third-layer index 2 and an input second-layer index 4.

Thus, a coefficient from the $k^{th}$ neuron at the $(L-1)^{th}$ layer to the $j^{th}$ neuron at the $L^{th}$ layer is defined as $W_{jk}^{L}$.

It should be noted that the input layer does not have the parameter W. In the deep neural network, more hidden layers make the network more capable of describing a complex case in the real world. Theoretically, a model with more parameters has higher complexity and a larger "capacity". It indicates that the model can complete a more complex learning task. Training the deep neural network is a process of learning a weight matrix, and a final objective of the training is to obtain a weight matrix of all layers of the trained deep neural network (a weight matrix formed by vectors W at many layers).

(3) Convolutional Neural Network

The convolutional neural network (CNN) is a deep neural network with a convolutional structure. The convolutional neural network includes a feature extractor including a convolution layer and a sub-sampling layer, and the feature extractor may be considered as a filter. The convolutional layer is a neuron layer that is in the convolutional neural network and at which convolution processing is performed on an input signal. At the convolutional layer of the convolutional neural network, one neuron may be connected only to some adjacent-layer neurons. One convolutional layer usually includes several feature planes, and each feature plane may include some neurons arranged in a rectangular form. Neurons on a same feature plane share a weight, where the shared weight is a convolution kernel. The shared weight may be understood as that a manner of extracting a feature is irrelevant to a location. The convolution kernel may be initialized in a form of a matrix of a random size. In a training process of the convolutional neural network, an appropriate weight may be obtained for the convolution kernel through learning. In addition, a direct benefit brought by weight sharing is that connections between layers of the convolutional neural network are reduced and an overfitting risk is lowered.

(4) Loss Function

In a process of training the deep neural network, because it is expected that an output of the deep neural network is as close as possible to a predicted value that is actually expected, a predicted value of a current network and a target value that is actually expected may be compared, and then a weight vector of each layer of the neural network is updated based on a difference between the predicted value and the target value (certainly, there is usually an initialization process before the first update, to be specific, parameters are preconfigured for all layers of the deep neural network). For example, if the predicted value of the network is large, the weight vector is adjusted to decrease the predicted value, and adjustment is continuously performed, until the deep neural network can predict the target value that is actually expected or a value that is very close to the target value that is actually expected. Therefore, "how to obtain, through comparison, a difference between the predicted value and the target value" needs to be predefined. This is a loss function (loss function) or an objective function (objective function). The loss function and the objective function are important equations that measure the difference between the predicted value and the target value. The loss function is used as an example. A higher output value (loss) of the loss function indicates a larger difference. Therefore, training of the deep neural network is a process of minimizing the loss as much as possible.

(5) Pixel Value

A pixel value of an image may be a red green blue (RGB) color value, and the pixel value may be a long integer representing a color. For example, the pixel value is 256× Red+100×Green+76×Blue, where Blue represents a blue component, Green represents a green component, and Red represents a red component. In each color component, a smaller value indicates lower brightness, and a larger value indicates higher brightness. For a grayscale image, a pixel value may be a grayscale value.

(6) YUV

YUV is a color space. Y indicates luminance (Luminance or Luma), that is, a grayscale value. U and V indicate chrominance (Chrominance or Chroma), and are used to describe the image color and saturation and specify the pixel color. "U" and "V" are two components that make up color. There is something special for the YUV color space: the luminance signal Y and chrominance signals U and V are separated. If there is only the Y signal component but no U or V signal component, the image represented in this way is a black-and-white grayscale image. The luminance signal may also be referred to as a luminance channel, and the chrominance signal may also be referred to as a chrominance channel.

(7) Encoder and Decoder

The encoder is configured to extract features of an input image. For example, the encoder may use a neural network, for example, a convolutional neural network.

The decoder is configured to restore extracted features into an image. For example, the decoder may use a neural network, for example, a convolutional neural network.

The following describes a system architecture provided in embodiments of this application.

Referring to FIG. 1, an embodiment of this application provides a system architecture 100. As shown in the system architecture 100, a data acquisition device 160 is configured to acquire training data. For example, the training data in embodiments of this application may include a first color image, a target color image, a first infrared image, and a target infrared image. After acquiring the training data, the data acquisition device 160 stores the training data in the database 130, and the training device 120 performs training based on the training data maintained in the database 130 to obtain a target model/rule 101.

The following describes how the training device 120 obtains the target model/rule 101 based on the training data. For example, the training device 120 processes the first color image and the first infrared image, and compares an outputted image with the target fused image. When a difference between the image outputted by the training device 120 and the target fused image is less than a specific threshold, training of the target model/rule 101 is completed.

The target model/rule 101 can be used to implement the image fusion method provided in embodiments of this application. To be specific, after related preprocessing is performed on a to-be-processed image, for example, a to-be-processed color image and an infrared image, the to-be-processed image is inputted into the target model/rule 101, to obtain a fused image. The target model/rule 101 in embodiments of this application may specifically be a neural network. It should be noted that, in actual application, the training data maintained in the database 130 is not necessarily data acquired by the data acquisition device 160, but may be received from another device. It should be noted further that the training device 120 may not necessarily train the target model/rule 101 completely based on the training data maintained in the database 130, or may obtain training data from a cloud or another place to perform model training. The foregoing descriptions should not be construed as a limitation on embodiments of this application.

The target model/rule 101 obtained through training by the training device 120 may be applied to different systems or devices, for example, the execution device 110 shown in FIG. 1. The execution device 110 may be a terminal, for example, a mobile phone, a tablet, a laptop computer, an augmented reality (AR)/virtual reality (VR) terminal, or a vehicle-mounted terminal, or may be a server, a cloud, or the like. In FIG. 1, the (input/output, I/O) interface 112 is configured for the execution device 110 to exchange data with an external device. A user may input data into the I/O interface 112 by using a client device 140. The inputted data may include a to-be-processed color image and an infrared image in embodiments of this application.

A preprocessing module 113 is configured to perform preprocessing based on the inputted data (for example, the to-be-processed color image and the infrared image) received by the I/O interface 112. In embodiments of this application, the preprocessing module 113 may be configured to obtain a fusion weight based on the to-be-processed color image or the infrared image.

For example, a preprocessing module 114 may be configured to obtain a background reference image.

In embodiments of this application, the preprocessing module 113 and the preprocessing module 114 may not exist, and a calculation module 111 is directly configured to process the input data.

In a process in which the execution device 110 preprocesses the input data, or in a process in which the calculation module 111 of the execution device 110 performs computing, the execution device 110 may invoke data, code, and the like in a data storage system 150 for corresponding processing, and may further store, in the data storage system 150, data, an instruction, and the like that are obtained through the corresponding processing.

Finally, the I/O interface 112 returns a processing result, for example, the foregoing obtained fused image, to the client device 140, to provide the processing result to the user.

It should be noted that the training device 120 may generate corresponding target models/rules 101 for different targets or different tasks based on different training data. The corresponding target models/rules 101 may be used to implement the foregoing targets or complete the foregoing tasks, to provide a required result for the user.

In a case shown in FIG. 1, the user may manually provide input data. The input data may be manually provided by using a screen provided by using the I/O interface 112. In another case, the client device 140 may automatically send the input data to the I/O interface 112. If the client device 140 is required to automatically send the input data, the client device 140 needs to obtain authorization from a user, and the user may set corresponding permission on the client device 140. The user may view, on the client device 140, a result output by the execution device 110. Specifically, the result may be presented in a form of displaying, a sound, an action, or the like. The client device 140 may alternatively be used as a data acquisition end, to acquire, as new sample data, input data that is inputted to the I/O interface 112 and an output result that is output from the I/O interface 112 that are shown in the figure, and store the new sample data in the database 130. It is clear that the client device 140 may alternatively not perform acquisition. Instead, the I/O interface 112 directly stores, in the database 130 as new sample data, the input data input to the I/O interface 112 and the output result output from the I/O interface 112.

It should be noted that FIG. 1 is merely a schematic diagram of a system architecture according to this embodiment of this application, and a location relationship between a device, a component, and a module that are shown in the figure does not constitute any limitation. For example, in FIG. 1, the data storage system 150 is an external memory relative to the execution device 110. In other cases, the data storage system 150 may alternatively be disposed in the execution device 110.

As shown in FIG. 1, the target model/rule 101 is obtained through training by the training device 120. The target model/rule 101 may be a neural network in this application in embodiments of this application. Specifically, the neural network in this application may include a CNN, a deep convolutional neural network (DCNN), or the like.

Because the CNN is a very common neural network, a structure of the CNN is mainly described in detail below with reference to FIG. 2. As described in the foregoing basic concepts, the convolutional neural network is a deep neural network having a convolutional structure, and is a deep learning architecture. In the deep learning architecture, multi-layer learning is performed at different abstract levels according to a machine learning algorithm. As a deep learning architecture, the CNN is a feed-forward artificial neural network. Neurons in the feed-forward artificial neural network may respond to an input image.

Figure 2:
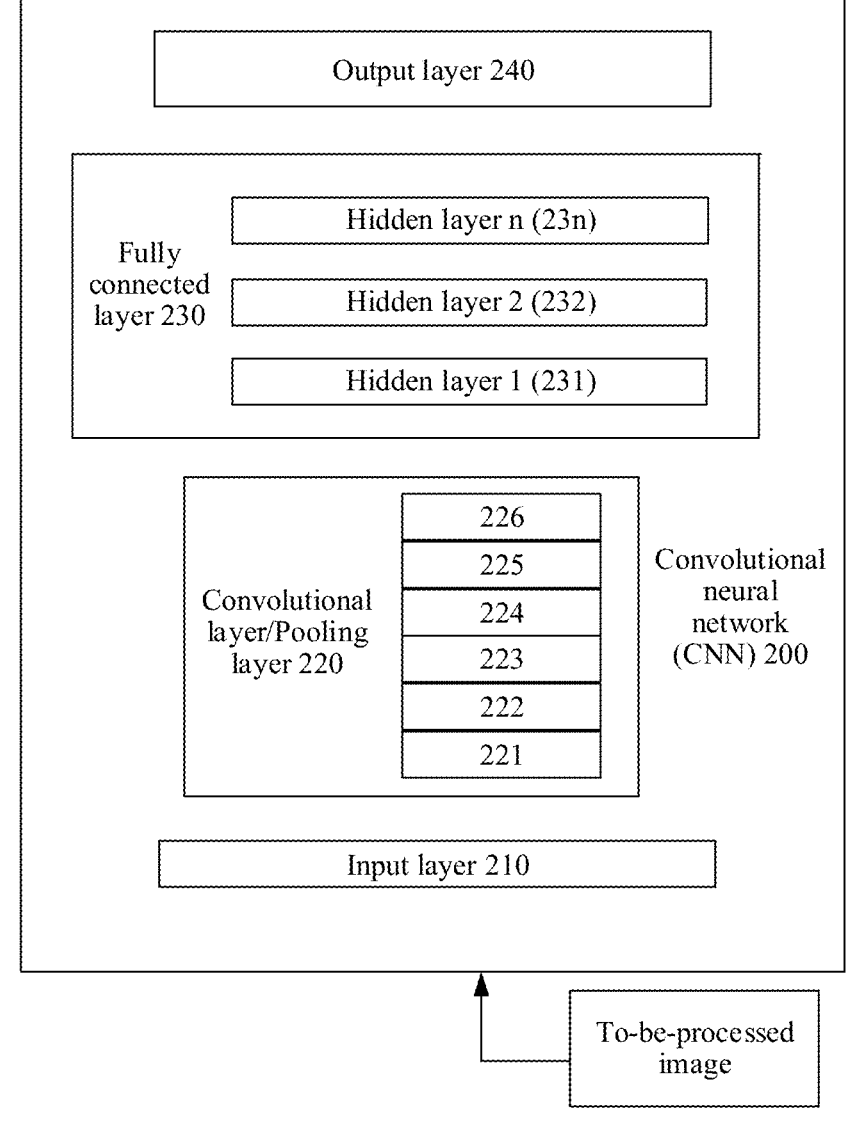
FIG. 2 is a schematic diagram of a convolutional neural network according to an embodiment of this application.

As shown in FIG. 2, a convolutional neural network (CNN) 200 may include an input layer 210, a convolutional layer/pooling layer 220 (the pooling layer is optional), and a fully connected layer (fully connected layer) 230.

Convolutional Layer/Pooling Layer 220

Convolutional Layer

As shown in FIG. 2, the convolution layer/pooling layer 220 may include, for example, layers 221 to 226. For example, in an embodiment, the layer 221 is a convolution layer, the layer 222 is a pooling layer, the layer 223 is a convolution layer, the layer 224 is a pooling layer, the layer 225 is a convolution layer, and the layer 226 is a pooling layer. In another implementation, the layers 221 and 222 are convolution layers, the layer 223 is a pooling layer, the layers 224 and 225 are convolution layers, and the layer 226 is a pooling layer. To be specific, an output of a convolutional layer may be used as an input of a subsequent pooling layer, or may be used as an input of another convolutional layer to continue to perform a convolution operation.

The following uses the convolutional layer 221 as an example to describe an internal working principle of one convolutional layer.

The convolutional layer 221 may include a plurality of convolution operators. A convolution operator is also referred to as a kernel. In image processing, the convolution operator functions as a filter that extracts specific information from an input image matrix. The convolution operator may essentially be a weight matrix, and the weight matrix is usually predefined. In a process of performing a convolution operation on an image, the weight matrix usually processes pixels at a granularity level of one pixel (or two pixels, depending on a value of a stride) in a horizontal direction on an input image, to extract a specific feature from the image. A size of the weight matrix should be related to a size of the image. It should be noted that a depth dimension of the weight matrix is the same as a depth dimension of the input image. During a convolution operation, the weight matrix extends to an entire depth of the input image. Therefore, convolution with a single weight matrix generates convolution output of a single depth dimension. However, in most cases, the single weight matrix is not used, but instead, a plurality of weight matrices of a same size (rows×columns), namely, a plurality of homogeneous matrices, are used. Outputs of the weight matrices are stacked to form a depth dimension of a convolutional image. The dimension herein may be understood as being determined based on the foregoing "plurality". Different weight matrices may be used to extract different features from the image. For example, one weight matrix is used to extract edge information of the image, another weight matrix is used to extract a specific color of the image, and still another weight matrix is used to blur unnecessary noise in the image. Sizes of the plurality of weight matrices (rows×columns) are the same. Sizes of feature maps extracted from the plurality of weight matrices with the same size are also the same, and then the plurality of extracted feature maps with the same size are combined to form an output of the convolution operation.

Weight values in these weight matrices need to be obtained through a lot of training during actual application. Each weight matrix formed by using the weight values obtained through training may be used to extract information from an input image, to enable the convolutional neural network 200 to perform correct prediction.

When the convolutional neural network 200 has a plurality of convolutional layers, a relatively large quantity of general features are usually extracted at an initial convolutional layer (for example, 221). The general feature may also be referred to as a low-level feature. As a depth of the convolutional neural network 200 increases, a feature extracted at a subsequent convolutional layer (for example, 226) is more complex, for example, a high-level semantic feature. A feature with higher-level semantics is more applicable to a to-be-resolved problem.

Pooling Layer

Because a quantity of training parameters usually needs to be reduced, pooling layers usually need to be periodically introduced after the convolution layers. For the layers 221 to 226 of the convolution layer/pooling layer 220 in FIG. 2, there may be one pooling layer following one convolution layer, or one or more pooling layers following a plurality of convolution layers. During image processing, the pooling layer is only used to reduce a space size of the image. The pooling layer may include an average pooling operator and/or a maximum pooling operator, to perform sampling on the input image to obtain an image with a relatively small size. The average pooling operator may be used to calculate pixel values in the image in a specific range, to generate an average value. The average value is used an average pooling result. The maximum pooling operator may be used to select a pixel with a maximum value in a specific range as a maximum pooling result. In addition, similar to that the size of the weight matrix at the convolutional layer needs to be related to the size of the image, an operator at the pooling layer also needs to be related to the size of the image. A size of a processed image outputted from the pooling layer may be less than a size of an image inputted into the pooling layer. Each pixel in the image outputted from the pooling layer represents an average value or a maximum value of a corresponding sub-region of the image inputted into the pooling layer.

Fully Connected Layer 230

After processing performed at the convolutional layer/ pooling layer 220, the convolutional neural network 200 is not ready to output required output information. As described above, at the convolutional layer/pooling layer 220, only a feature is extracted, and parameters resulting from an input image are reduced. However, to generate final output information (required class information or other related information), the convolutional neural network 200 needs to use the fully connected layer 230 to generate an output of one required class or outputs of a group of required classes. Therefore, the fully connected layer 230 may include a plurality of hidden layers (231, 232, . . . , 23$n$ shown in FIG. 2). Parameters included in the plurality of hidden layers may be obtained by pre-training based on related training data of a specific task type. For example, the task type may include image recognition, image classification, image super-resolution reconstruction, and the like.

At the fully connected layer 230, the plurality of hidden layers are followed by an output layer 240, namely, the last layer of the entire convolutional neural network 200. The output layer 240 has a loss function similar to a categorical cross entropy, and the loss function is specifically configured to calculate a prediction error. Once forward propagation (for example, propagation in a direction from 210 to 240 in FIG. 2) of the entire convolutional neural network 200 is completed, back propagation (for example, propagation in a direction from 240 to 210 in FIG. 2) is started to update a weight value and a deviation of each layer mentioned above, to reduce a loss of the convolutional neural network 200 and an error between a result outputted by the convolutional neural network 200 by using the output layer and an ideal result.

It should be noted that the convolutional neural network 200 shown in FIG. 2 is merely used as an example of a convolutional neural network. In specific application, the convolutional neural network may alternatively exist in a form of another network model, for example, include only a part of the network structure shown in FIG. 2. For example, the convolutional neural network used in embodiments of this application may include only the input layer 210, the convolutional layer/pooling layer 220, and the output layer 240.

The following describes a chip hardware structure provided in an embodiment of this application.

Figure 3:
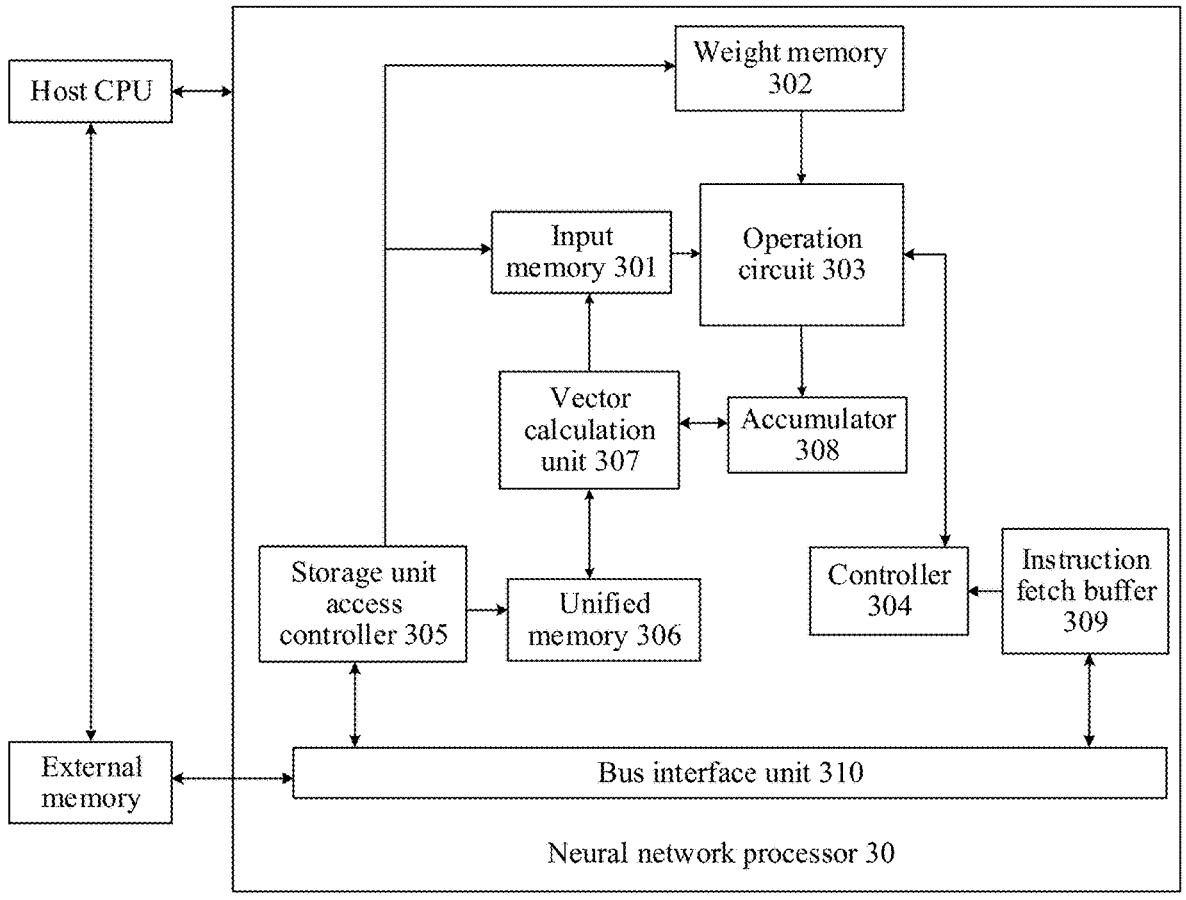
FIG. 3 is a schematic diagram of a hardware structure of a chip according to an embodiment of this application.

FIG. 3 shows a hardware structure of a chip according to an embodiment of this application. The chip includes a neural network processor 30. The chip may be disposed in the execution device 110 shown in FIG. 1, to complete calculation work of the calculation module 111. The chip may alternatively be disposed in the training device 120 shown in FIG. 1, to complete training work of the training device 120 and output the target model/rule 101. All algorithms of the layers in the convolutional neural network shown in FIG. 2 may be implemented in the chip shown in FIG. 3. Both the image fusion method and the training method for an image fusion model in embodiments of this application may be implemented in the chip shown in FIG. 3.

The neural network processor 30 may be any processor suitable for large-scale exclusive OR operation processing, for example, a neural-network processing unit (NPU), a tensor processing unit (TPU), or a graphics processing unit (GPU). An NPU is used as an example. The neural network processor NPU 30 is mounted to a host central processing unit (CPU) (host CPU) as a coprocessor, and the main CPU allocates a task. A core part of the NPU is an operation circuit 303. A controller 304 controls the operation circuit 303 to extract data from a memory (a weight memory or an input memory) and perform an operation. The TPU is an artificial intelligence accelerator-specific integrated circuit customized by Google for machine learning.

In some embodiments, the operation circuit 303 internally includes a plurality of processing units (process engine, PE). In some embodiments, the operation circuit 303 is a two-dimensional systolic array. Alternatively, the operation circuit 303 may be a one-dimensional systolic array or another electronic circuit that can perform mathematical operations such as multiplication and addition. In some embodiments, the operation circuit 303 is a general-purpose matrix processor.

For example, it is assumed that there are an input matrix A, a weight matrix B, and an output matrix C. The operation circuit 303 obtains weight data of the matrix B from a weight memory 302, and buffers the data in each PE in the operation circuit 303. The operation circuit 303 obtains input data of the matrix A from an input memory 301, performs a matrix operation on the input data of the matrix A and the weight data of the matrix B, and stores an obtained partial result or final result of the matrices in an accumulator (accumulator) 308.

A vector calculation unit 307 may further process an output of the operation circuit, for example, vector multiplication, vector addition, an index operation, a logarithm operation, and size comparison. For example, the vector calculation unit 307 may be configured to perform network computation, such as pooling, batch normalization, or local response normalization, at a non-convolution/non-FC layer of a neural network.

In some embodiments, the vector calculation unit 307 can store a processed output vector in a unified cache 306. For example, the vector calculation unit 307 may apply a non-linear function to the output, for example, a vector of an accumulated value, of the operation circuit 303 to generate an activation value. In some embodiments, the vector calculation unit 307 generates a normalized value, a combined value, or both. In some embodiments, the vector calculation unit 307 stores a processed vector in the unified memory 306. In some embodiments, a vector processed by the vector calculation unit 307 can be used as an activation input of the operation circuit 303, for example, used in a subsequent layer of the neural network. As shown in FIG. 2, if a current processed layer is a hidden layer 1 (231), the vector processed by the vector calculation unit 307 may further be used in calculation at a hidden layer 2 (232).

The unified memory 306 is configured to store input data and output data.

The weight data is directly stored in the weight memory 302 by using a storage unit access controller (DMAC) 305. The input data is also stored in the unified memory 306 by using the DMAC.

A bus interface unit (BIU) 310 is used for interaction between the DMAC and an instruction fetch buffer 309. A bus interface unit 310 is further used by the instruction fetch buffer 309 to obtain an instruction from an external memory. The bus interface unit 310 is further used by the storage unit access controller 305 to obtain original data of the input matrix A or the weight matrix B from the external memory.

The DMAC is mainly configured to store the input data in the external memory DDR into the unified memory 306, or store the weight data into the weight memory 302, or store the input data into the input memory 301.

The instruction fetch memory (instruction fetch buffer) 309 connected to the controller 304 is configured to store instructions used by the controller 304.

The controller 304 is configured to invoke the instructions cached in the instruction fetch buffer 309, to implement a working process of controlling an operation accelerator.

Generally, each of the unified memory 306, the input memory 301, the weight memory 302, and the instruction fetch buffer 309 is an on-chip memory. The external memory is a memory outside the NPU. The external memory may be a double data rate synchronous dynamic random access memory (DDR SDRAM), a high bandwidth memory (high bandwidth memory, HBM), or another readable and writable memory.

Operations at various layers in the convolutional neural network shown in FIG. 2 may be performed by the operation circuit 303 or the vector calculation unit 307. For example, both the training method for an image fusion model and the image fusion method in embodiments of this application may be performed by the operation circuit 303 or the vector calculation unit 307.

Figure 4:
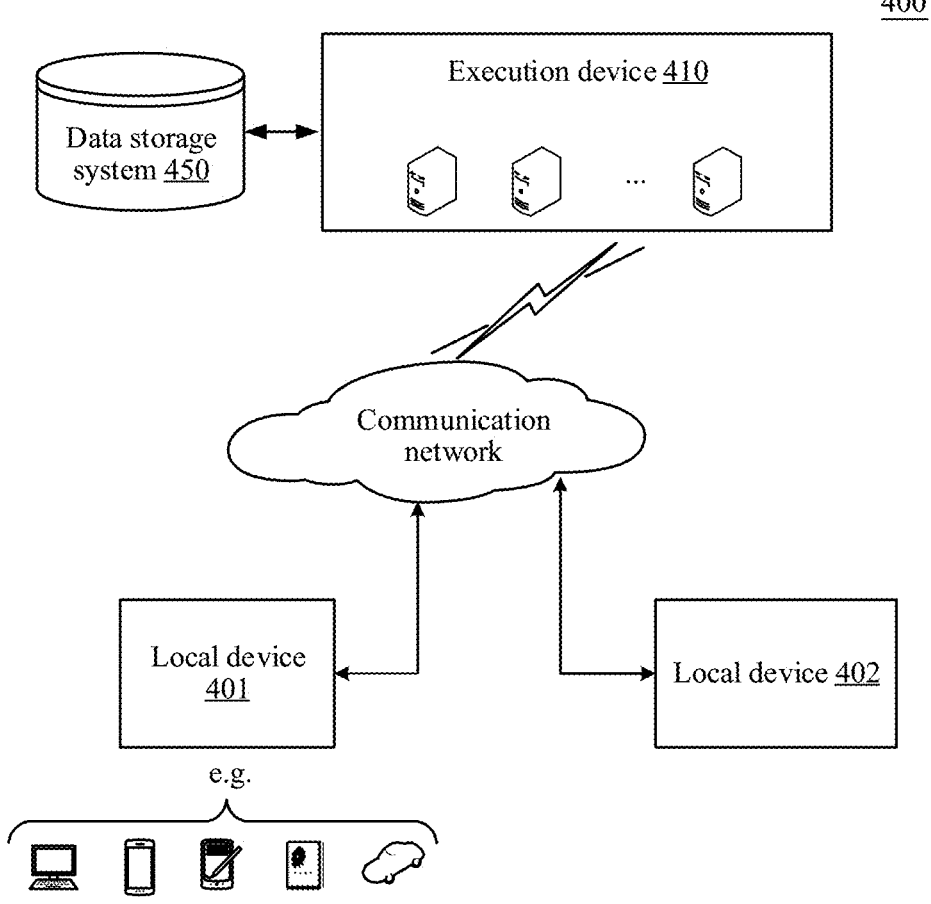
FIG. 4 is a schematic diagram of a system architecture according to an embodiment of this application.

FIG. 4 shows a system architecture 400 according to an embodiment of this application. The system architecture 400 includes a local device 401, a local device 402, an execution device 410, and a data storage system 450. The local device 401 and the local device 402 are connected to the execution device 410 by a communication network.

The execution device 410 may be implemented by one or more servers. Optionally, the execution device 410 may cooperate with another computing device, for example, a device such as a data memory, a router, or a load balancer. The execution device 410 may be disposed on one physical site, or distributed on a plurality of physical sites. The execution device 410 may implement a training method for a time series prediction model in embodiments of this application by using data in the data storage system 450 or by invoking program code in the data storage system 450.

For example, in an embodiment, the execution device 410 may perform the following process:

obtaining at least one training sample, where the training sample includes a first color image, a first infrared image, a target color image, and a target infrared image, the first color image, the first infrared image, the target color image, and the target infrared image are shot for a same scene, the same scene means that a similarity between any two of the first color image, the first infrared image, the target color image, and the target infrared image is greater than a first threshold, the first color image and the target color image are images formed by reflection of visible light by the scene, and the first infrared image and the target infrared image are images formed by reflection of light in an infrared band by the scene; and a signal-to-noise ratio of the target color image is greater than a signal-to-noise ratio of the first color image, and a signal-to-noise ratio of the target infrared image is greater than a signal-to-noise ratio of the first infrared image; and training an image fusion model using the first color image and the first infrared image as inputs of the image fusion model and using a target that a value of a loss function is less than a fourth threshold, to obtain a trained image fusion model, where the loss function includes a first loss function, the first loss function is for indicating a difference between an image outputted by the image fusion model and a target fused image, and the target fused image is determined based on the target color image and the target infrared image.

Through the foregoing process, the execution device 410 can obtain the image fusion model, and the image fusion model may be used to obtain a fused image.

The user may operate respective user equipment (for example, the local device 401 and the local device 402) to interact with the execution device 410. Each local device may be any computing device, such as a personal computer, a computer workstation, a smartphone, a tablet computer, an intelligent camera, a smart automobile or another type of cellular phone, a media consumption device, a wearable device, a set-top box, or a game console.

A local device of each user may interact with the execution device 410 through a communication network of any communication mechanism/communication standard. The communication network may be a wide area network, a local area network, a point-to-point connection, or any combination thereof.

In an embodiment, the local device 401 and the local device 402 obtain the image fusion model from the execution device 410, deploy the image fusion model on the local device 401 and the local device 402, and perform image fusion using the image fusion model.

In another implementation, the image fusion model may be directly deployed on the execution device 410. The execution device 410 obtains to-be-processed images from the local device 401 and the local device 402, and performs image fusion on the to-be-processed images by using the image fusion model.

Alternatively, the execution device 410 may be a cloud device. In this case, the execution device 410 may be deployed on a cloud. Alternatively, the execution device 410 may be a terminal device. In this case, the execution device 410 may be deployed on a user terminal side. This is not limited in embodiments of this application.

Figure 5:
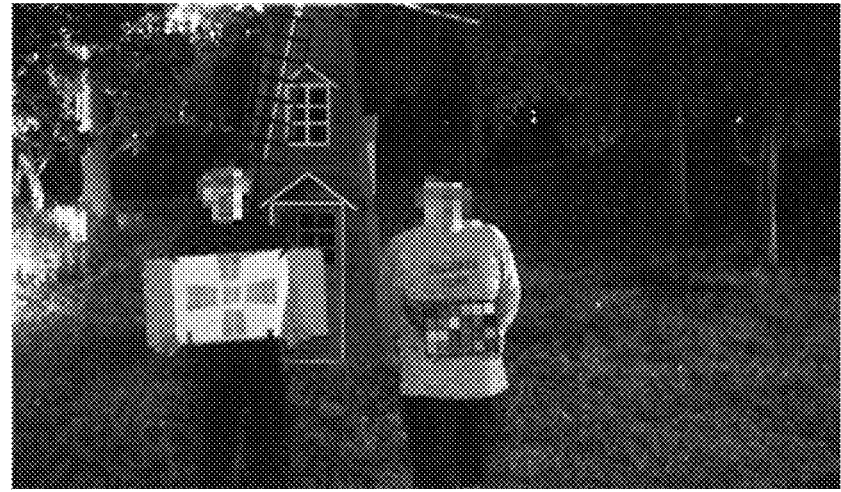
FIG. 5 is a schematic diagram of a color image and an infrared image that are shot at night.
Figure 5:
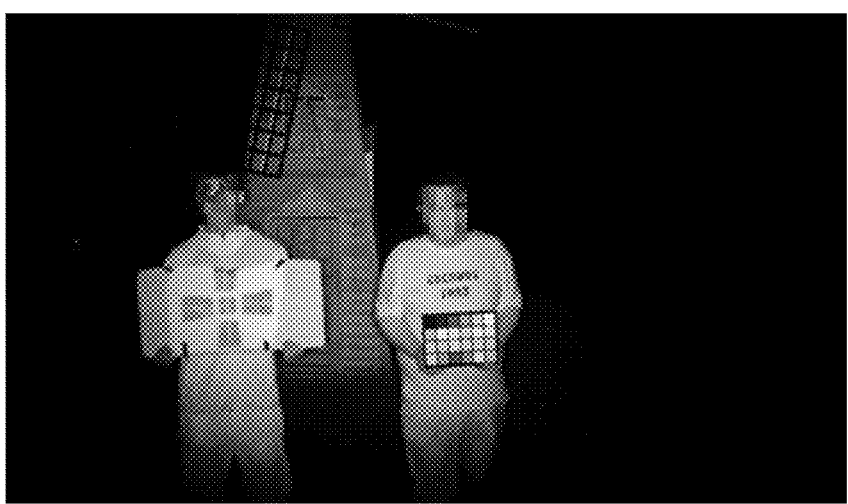

In a low-illumination scene, for example, a rainy weather or a night scene, a shot image or video has problems such as low resolution, poor contrast, and image detail loss. For example, in color path imaging in a low-illumination scene shown in (a) of FIG. 5, a face basically cannot be identified. Current devices usually use near-infrared fill-in light to improve imaging quality in low-illumination scenes. As shown in (b) of FIG. 5, good human body details and human face details may be obtained from near-infrared imaging in a low-illumination scene. However, due to an imaging feature of the near-infrared imaging, an infrared image cannot restore real color of an object. Because a color image and an infrared image are complementary to each other, a fused image can be obtained by fusing the color image and the infrared image. A conventional fusion manner is usually fusion based on a luminance channel. To be specific, a color path image is first converted into a YUV color space, then multi-scale fusion is performed on a luminance channel Y and a corresponding infrared image, and a fused Y channel is combined with original UV to obtain a final fusion result. However, the fused image obtained based on luminance channel fusion may cause problems such as image saturation reduction, color distortion, and a large amount of noise. A deep learning manner may be used to implement fusion of a color image and an infrared image. However, currently, a fusion task of a high-definition color image and an infrared image is usually targeted. When quality of a color image is low, the infrared image is used only as a noise reduction reference for the color image, and a fusion effect cannot be ensured. A large quantity of details are lost in an output image, affecting quality of the output image.

Therefore, how to improve imaging quality in a low-illumination scene becomes an urgent problem to be resolved.

Embodiments of this application provide a training method for an image fusion model and an image fusion method, to improve imaging quality in a low-illumination scene.

In the image fusion method in embodiments of this application, a color image and an infrared image are used as input data. Therefore, the solution in embodiments of this application is applicable to a scenario in which a color image and an infrared image can be obtained. The following describes three methods for obtaining a color image and an infrared image by using examples.

Figure 6:
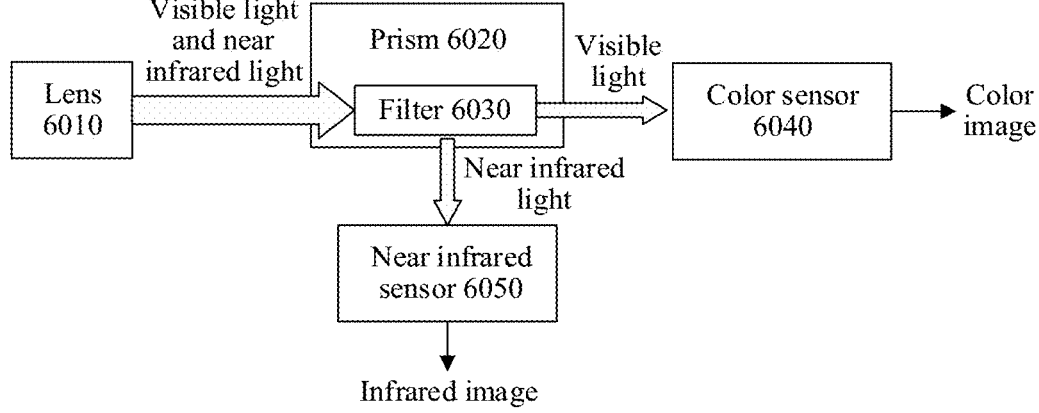
FIG. 6 is a schematic diagram of an apparatus for obtaining a color image and an infrared image according to an embodiment of this application.

Example 1: A Color Image and an Infrared Image are Obtained Based on a Light-Splitting Prism As shown in FIG. 6, the light-splitting prism includes a prism 6020 and a light filter 6030. Incident light received by a lens 6010 may be divided into visible light and near-infrared light by using the light-splitting prism, and visible light and near-infrared light are separately imaged by using two sensors: a color sensor 6040 and a near-infrared sensor 6050, to obtain a color image and an infrared image at the same time.

Figure 7:
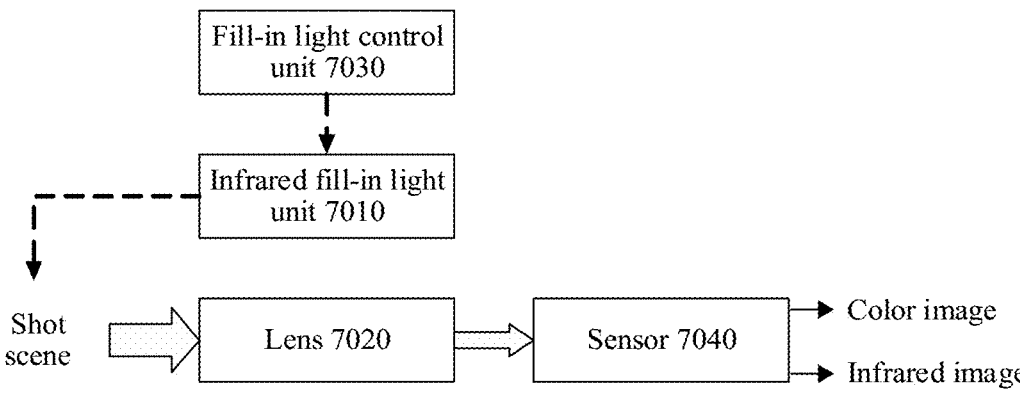
FIG. 7 is a schematic diagram of another apparatus for obtaining a color image and an infrared image according to an embodiment of this application.

Example 2: A Color Image and an Infrared Image are Obtained in a Time Division and Frame Interpolation Manner As shown in FIG. 7, a fill-in light control unit 7030 controls, by periodically enabling and disabling an infrared fill-in light unit 7010, the type of light transmitted by a lens 7020 to the surface of a sensor 7040, that is, visible light or infrared light, to separately image visible light and infrared light in a shot scene. It should be understood that the infrared image shown in FIG. 7 may alternatively be a composite image of an infrared image and a color image. In a case of low illumination, a color image in the composite image has a small amount of information. Therefore, the composite image may be used as the infrared image in embodiments of this application. The color image and the infrared image at the same moment are obtained by using a frame interpolation algorithm. Frame interpolation refers to obtaining an image of an intermediate frame by using image information of two consecutive frames.

Figure 8:
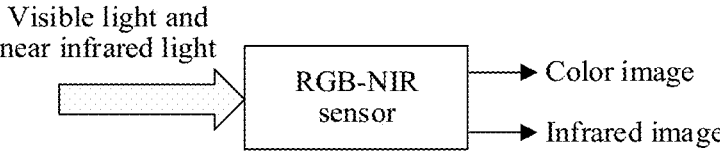
FIG. 8 is a schematic diagram of still another apparatus for obtaining a color image and an infrared image according to an embodiment of this application.

Example 3: A Color Image and an Infrared Image are Obtained Based on an RGB-Near-Infrared (NIR) Sensor As shown in FIG. 8, by using a design of an information sensor such as RGB-NIR, a color path and an infrared image are obtained at the same time through one imaging.

The following describes in detail the training method for an image fusion model and the image fusion method in embodiments of this application with reference to the accompanying drawings.

Figure 9:
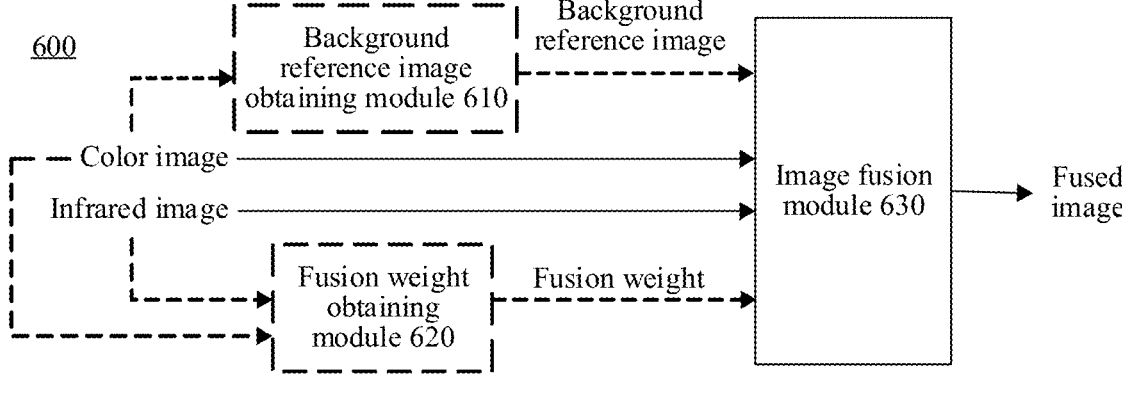
FIG. 9 is a schematic block diagram of an image fusion apparatus according to an embodiment of this application.

FIG. 9 is a schematic diagram of an image fusion apparatus 600 according to an embodiment of this application. To better understand the method in embodiments of this application, the following briefly describes functions of the modules in FIG. 9.

The apparatus 600 may be a cloud service device, or may be a terminal device, for example, a device whose computing capability is sufficient to train a time series prediction model, such as a computer or a server, or may be a system including a cloud service device and a mobile device. For example, the apparatus 600 may be the training device 120 in FIG. 1, the neural network processor 30 in FIG. 3, the local device or the execution device in FIG. 4, or the like.

The apparatus 600 includes a background reference image obtaining module 610, a fusion weight obtaining module 620, and an image fusion module 630.

In embodiments of this application, enhancement of the color image is implemented by fusion of the color image and the infrared image, and the image fusion model may also be understood as an image enhancement model.

The background reference image obtaining module 610 is configured to: obtain a background reference image, and input the background reference image into the image fusion module 630. A background area in the background reference image is the same as a background area in the color image.

As shown in FIG. 9, the background reference image obtaining module may obtain the background reference image based on the color image. It should be understood that FIG. 9 is merely an example. The background reference image obtaining module 610 may alternatively obtain the background reference image in another manner. For a manner of obtaining the background reference image, refer to the following method 800.

It should be noted that the background reference image obtaining module 610 is an optional module.

The fusion weight obtaining module 620 is configured to obtain a fusion weight, and input the fusion weight into the image fusion module 630. The fusion weight is for adjusting a fusion ratio of a color image and an infrared image in an image outputted by the image fusion model.

As shown in FIG. 9, the fusion weight obtaining module may obtain the fusion weight based on the infrared image. Alternatively, the fusion weight obtaining module may obtain the fusion weight based on the color image. It should be understood that FIG. 9 is merely an example. The fusion weight obtaining module 620 may further obtain the fusion weight based on a manner. For a specific manner of obtaining the fusion weight, refer to the following method 900.

It should be noted that the fusion weight obtaining module 620 is an optional module.

The image fusion module 630 is configured to perform image fusion on the color image and the infrared image to obtain a fused image.

When the apparatus 600 includes the background reference image obtaining module 610, the image fusion module 630 may perform image fusion on the color image and the infrared image based on the background reference image, to obtain the fused image. Alternatively, it may be understood that the image fusion module 630 performs image fusion on the background reference image, the color image, and the infrared image to obtain the fused image.

When the apparatus 600 includes the fusion weight obtaining module 620, the image fusion module 630 may perform image fusion on the color image and the infrared image based on the fusion weight to obtain the fused image.

The following describes in detail the training method for an image fusion model in embodiments of this application with reference to FIG. 10 to FIG. 15.

Figure 10:
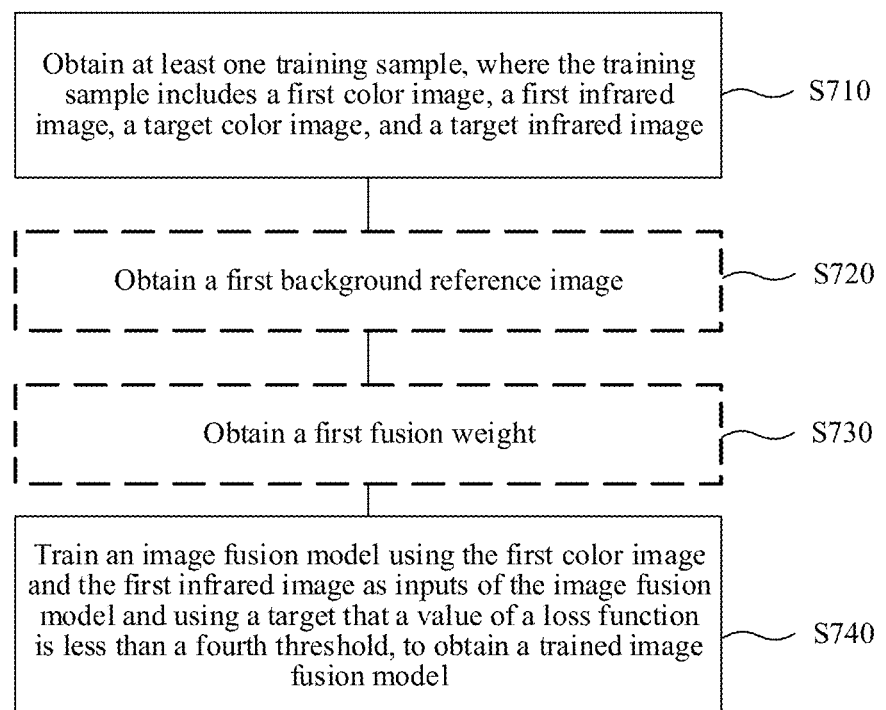
FIG. 10 is a schematic flowchart of a training method for an image fusion model according to an embodiment of this application.

FIG. 10 shows a training method 700 for an image fusion model according to an embodiment of this application. The method shown in FIG. 10 may be performed by a training apparatus for an image fusion model. The training apparatus for an image fusion model may be a cloud service device, or may be a terminal device, for example, an apparatus whose computing capability is sufficient to perform the training method for an image fusion model, such as a computer or a server, or may be a system including a cloud service device and a terminal device. For example, the method 700 may be performed by the training device 120 in FIG. 1, the neural network processor 30 in FIG. 3, the execution device 410 in FIG. 4, or a local device.

For example, the method 700 may be specifically performed by the training device 120 shown in FIG. 1. The first color image, the target color image, the first infrared image, and the target infrared image in the method 700 may be training data maintained in the database 130 shown in FIG. 1. Optionally, S720 and S730 of the method 700 may be performed in the training device 120, or may be performed in advance by another functional module before the training device 120. To be specific, the training data received or obtained from the database 130 is first preprocessed, for example, the obtaining process described in S720 and S730, to obtain the first background reference image and the first fusion weight as inputs of the training device 120, and the training device 120 performs step S710 and step S740.

In another example, the method 700 may be specifically performed by a local device in FIG. 4, and the local device may be a monitoring device. For example, the method 700 may be performed by a calculation module on the monitoring device.

Optionally, the method 700 may be processed by a CPU, or may be jointly processed by a CPU and a GPU, or may not use a GPU, but use another processor suitable for neural network computation. This is not limited in this application.

The method 700 includes step S710 to step S740. The following describes step S710 to step S740 in detail.

S710: Obtain at least one training sample. The training sample includes a first color image, a target color image, a first infrared image, and a target infrared image.

In embodiments of this application, the color image may also be referred to as a visible light image.

The first color image and the target color image are images formed by reflection of visible light by the scene, and the first infrared image and the target infrared image are images formed by reflection of light in an infrared band by the scene.

For example, the color image may be obtained by using a visible light imaging sensor, and the infrared image is obtained by using an infrared imaging sensor. The first color image, the first infrared image, the target color image, and the target infrared image are shot for a same scene.

The same scene means that a similarity between any two of the first color image, the first infrared image, the target color image, and the target infrared image is greater than a first threshold.

The similarity in embodiments of this application may be an image texture similarity. For example, the similarity between any two of the first color image, the first infrared image, the target color image, and the target infrared image may be an image texture similarity between any two of the first color image, the first infrared image, the target color image, and the target infrared image. The first color image is in a one-to-one correspondence with the first infrared image. For example, the first infrared image may be an infrared image shot at a same moment as the first color image.

The target color image is in a one-to-one correspondence with the target infrared image. For example, the target infrared image is an infrared image that is at a same moment as the target color image.

For a manner of obtaining the color image and the corresponding infrared image, refer to FIG. 6 to FIG. 8. This is not limited in embodiments of this application.

A signal-to-noise ratio of the target color image is greater than a signal-to-noise ratio of the first color image. The target color image may be understood as a high-definition image corresponding to the first color image. For example, the target color image may be a high-definition image shot in daytime, and the first color image may be an image shot at night with noise.

The signal-to-noise ratio refers to a ratio of a signal to noise, for example, a ratio of a power spectrum of a signal to noise, or a ratio of a variance of a signal to noise. When the signal-to-noise ratio (SNR) is higher, image quality is better, and an image is clearer.

Resolution of the target infrared image is higher than that of the first infrared image. The target infrared image may be understood as a high-definition image corresponding to the first infrared image. For example, the target infrared image may be a high-definition image shot in daytime, and the first infrared image may be an image shot at night with noise.

Figure 11:
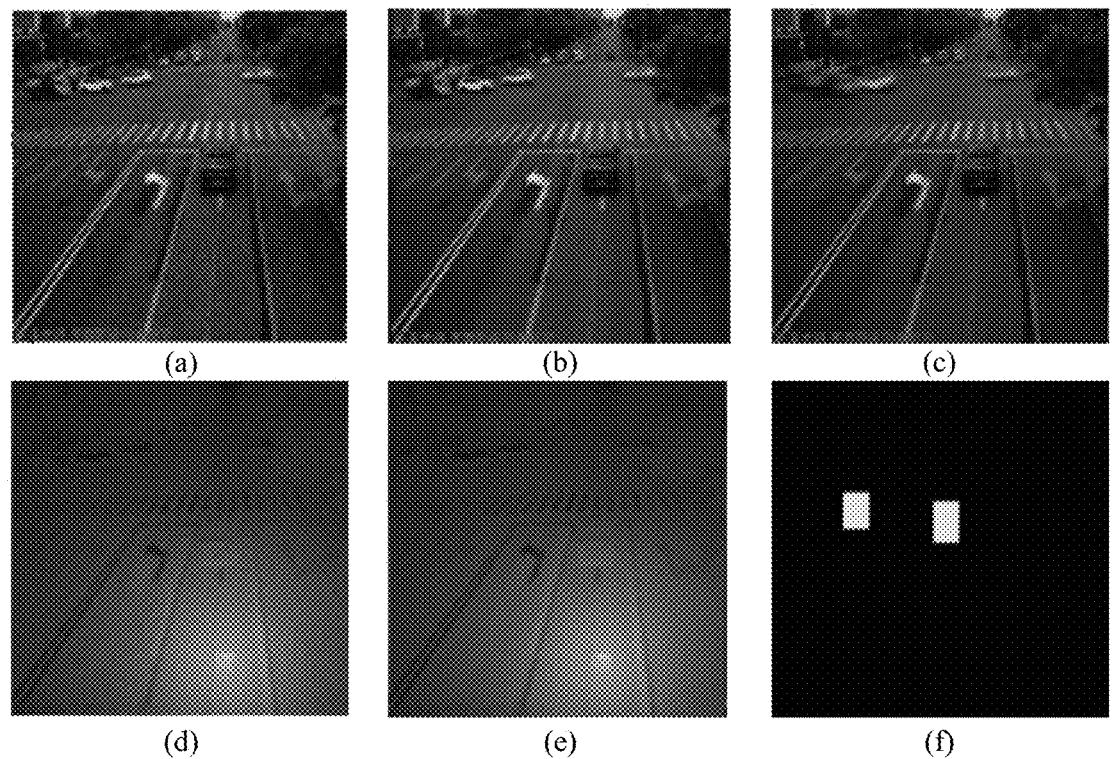
FIG. 11 is a schematic diagram of a training sample according to an embodiment of this application.

The "shot for a same scene" may be understood as that the images have the same picture content. For example, for images shot in a same region, the same region is a same scene. Picture content in the images shown in FIG. 11 is the same, that is, images shot for a same scene.

In some embodiments, the first infrared image and the target infrared image may be a same image. In this case, the training sample includes the first color image, the target color image, and the first infrared image. In other words, the training sample includes three types of images.

S720: Obtain a first background reference image.

A similarity between the first background reference image and the first color image is greater than a second threshold.

For example, a background area in the first background reference image is the same as a background area in the first color image. That the similarity between the first background reference image and the first color image is greater than a second threshold may be that a similarity between the background area in the first background reference image and the background area in the first color image is greater than the second threshold. The background area may be determined by using the prior art. This is not limited in embodiments of this application.

A background signal-to-noise ratio of the background reference image is usually greater than a background signal-to-noise ratio of the first color image.

Figure 12:
FIG. 12 is a schematic diagram of a background reference image according to an embodiment of this application.
Figure 12:

The background area in the image in embodiments of this application may be set as required. FIG. 12 is used as an example. The background area in the image may include a building in the image, or may not include a building in the image. A background area division method is not limited in embodiments of this application.

Step S720 is an optional step.

In some embodiments, the training sample may further include a first background reference image. When the at least one training sample is obtained in step S710, the first background reference image is obtained.

For a specific manner of obtaining the first background reference image, refer to the following method 800.

For example, the first background reference image may be inputted into the image fusion model in a form of a color image, or may be inputted into the image fusion model in a form of a grayscale image. For example, the first background reference image is directly inputted into the image fusion model. In another example, a luminance channel of the first background reference image may be inputted into the image fusion model.

S730: Obtain a first fusion weight.

Step S730 is an optional step.

In some embodiments, the training sample may further include the first fusion weight. When the at least one training sample is obtained in step S710, the first fusion weight is obtained.

For a specific manner of obtaining the first fusion weight, refer to the following method 900.

The first fusion weight is for weighting the first color image and the first infrared image.

In other words, the first fusion weight is for adjusting a fusion ratio of the first color image and the first infrared image in the image outputted by the image fusion model.

The first fusion weight is for adjusting a fusion ratio of a color image and an infrared image in an image fusion process. In other words, the first fusion weight is for adjusting a ratio of an information amount of the first color image to an information amount of the first infrared image that are included in the image outputted by the image fusion model.

Optionally, the first fusion weight corresponds to a part or all of the image outputted by the image fusion model.

In other words, the first fusion weight may be a global weight.

The global weight is for indicating a fusion weight of the entire image in the image fusion process. That is, all areas in the entire image use a same fusion weight in the image fusion process. Only one first fusion weight is used in the entire image outputted by the image fusion model. In any area of the image outputted by the image fusion model, a fusion ratio of the first color image and the first infrared image is the same.

For example, when the global weight corresponding to the infrared image is larger, the fused image outputted by the image fusion model includes more information of the infrared image, that is, the fused image is more similar to the infrared image. When the global weight corresponding to the color image is larger, the fused image outputted by the image fusion model includes more information of the color image, that is, the fused image is more similar to the color image.

Optionally, the first fusion weight corresponds to a part of the image outputted by the image fusion model.

That the first fusion weight corresponds to a part of the image outputted by the image fusion model may be understood as that the first fusion weight corresponds to one area in the image outputted by the image fusion model. In this case, a plurality of first fusion weights may be used, and the plurality of first fusion weights respectively correspond to different areas in the image outputted by the image fusion model.

The first fusion weight may be understood as a local weight. The local weight is for indicating a fusion weight of a local area in an image fusion process. In other words, in the fusion process, different first fusion weights may be used for different areas.

For example, a weight corresponding to an infrared image in an area A is large, and a weight corresponding to an infrared image in an area B is small. In the fused image outputted by the image fusion model, the area A includes a large amount of information of the infrared image, and the area B includes a large amount of the information of the color image. To be specific, the area A is more similar to the area A in the infrared image, and the area B is more similar to the area B in the color image.

For example, the first fusion weight may be inputted into the image fusion model in a form of a parameter, or may be inputted into the image fusion model in a form of a fusion weight map. This is not limited in this application.

A value in the fusion weight map may be for indicating the first fusion weight. For example, values of different areas in the fusion weight map may be for representing a plurality of first fusion weights.

The first fusion weight is represented in a form of a fusion weight map, so that complexity of adjusting the first fusion weight can be reduced. When the first fusion weight corresponds to a part of the image outputted by the image fusion model, it is more helpful to represent, by using the fusion weight map, an area corresponding to the first fusion weight. Especially when the area corresponding to the first fusion weight is of an irregular shape, a form of the fusion weight map is more conducive to representing the area corresponding to the first fusion weight.

FIG. 11 is a schematic diagram of a training sample. As shown in FIG. 11, (a) of FIG. 11 is a first color image In_Vis, (b) of FIG. 11 is a target color image Gt_Vis, (c) of FIG. 11 is a luminance channel In_VisRef_Y of a first background reference image, (d) of FIG. 11 is a first infrared image In_Nir, (e) of FIG. 11 is a target infrared image Gt_Nir, and (f) of FIG. 11 is a fusion weight map In_FuseMap.

It should be understood that FIG. 11 is merely an example. The training sample may not include the luminance channel In_VisRef_Y and the fusion weight map In_FuseMap of the first background reference image, or may include one of the two, for example, include the fusion weight map In_FuseMap, or include the luminance channel In_VisRef_Y of the first background reference image. In the training sample in FIG. 11, the first background reference image exists in a form of a luminance channel, that is, is inputted into the image fusion model in a form of a luminance channel. This is merely an example. For example, the first background reference image may alternatively exist in a form of a color image, that is, be inputted into the image fusion model in a form of a color image. In the training sample in FIG. 11, the first fusion weight exists in a form of a fusion weight map, that is, is inputted into the image fusion model in a form of a weight fused image. This is merely an example. Alternatively, the first fusion weight may exist in a form of a parameter, that is, the first fusion weight is inputted into the image fusion model in a form of a parameter. In addition, in the training sample in FIG. 11, there are two first fusion weights, weight values in two rectangular boxes are the same, and weight values outside the rectangular boxes are the same. This is merely an example. More first fusion weights may be set, or the first fusion weight may be a global weight.

S740: Train an image fusion model using the first color image and the first infrared image as inputs of the image fusion model and using a target that a value of a loss function is less than a fourth threshold, to obtain a trained image fusion model.

The loss function includes a first loss function. The first loss function is for indicating a difference between an image outputted by the image fusion model and a target fused image. The target fused image is determined based on the target color image and the target infrared image.

The target fused image may be a color image, or may be a grayscale image.

Optionally, the target fused image may be an image of a luminance channel. The difference between the image outputted by the image fusion model and the target fused image is a difference between a luminance channel of the image outputted by the image fusion model and the target fused image.

In this case, the image fusion model is trained with a target of reducing the value of the first loss function, that is, continuously reducing the difference between the luminance channel of the image outputted by the image fusion model and the target fused image. The training process may be understood as a fusion task. The first loss function may be understood as a loss function corresponding to the fusion task.

In this way, training may be performed at a luminance channel layer, to help fuse more texture features and reduce impact of another factor on an image fusion process.

Further, the determining the target fused image based on the target color image and the target infrared image includes:

determining the target fused image based on a luminance channel of the target color image and a luminance channel of the target infrared image.

To better describe a method for determining the target fused image, the following describes a luminance channel.

The luminance channel includes structure information S, contrast information C, and a luminance average value L. It may also be understood that the luminance channel may be decomposed into the structure information S, the contrast information C, and the luminance average value L.

For example, a luminance channel $y_k$ of the image block k may be decomposed into a luminance average value $l_k$ of the image block k, structure information $s_k$ of the image block k, and contrast information $c_k$ of the image block k.

The luminance channel $y_k$, the luminance average value $l_k$, the structure information $s_k$, and the contrast information $c_k$ satisfy the following formula:

$$c_k = \left\| y_k - \mu_{y_k} \right\|;$$

$$s_k = \frac{y_k - \mu_{y_k}}{\left\| y_k - \mu_{y_k} \right\|};$$

$$l_k = \mu_{y_k}; \text{ and}$$

$$y_k = \left\| y_k - \mu_{y_k} \right\| \times \frac{y_k - \mu_{y_k}}{\left\| y_k - \mu_{y_k} \right\|} + \mu_{y_k} = c_k \times s_k + l_k,$$

where $\mu_{y_k}$ represents the luminance average value of the image block k.

The luminance channel of the image may be decomposed in the foregoing manner, to obtain the structure information, the contrast information, and the luminance average value of the image. For example, the luminance channel of the target color image and the luminance channel of the target infrared image satisfy the following formula:

$$y_{gt\_Vis} = c_{gt\_Vis} \times s_{gt\_Vis} + l_{gt\_Vis}; \text{ and}$$

$$y_{gt\_Nir} = c_{gt\_Nir} \times s_{gt\_Nir} + l_{gt\_Nir},$$

where $y_{gt\_Vis}$ indicates the luminance channel of the target color image, $c_{gt\_Vis}$ indicates the contrast of the target color image, $s_{gt\_Vis}$ indicates the structure information of the target color image, $l_{gt\_Vis}$ indicates the luminance average value of the target color image, $y_{gt\_Nir}$ indicates the luminance channel of the target infrared image, $c_{gt\_Nir}$ indicates the contrast of the target infrared image, $s_{gt\_Nir}$ indicates the structure information of the target infrared image, and $l_{gt\_Nir}$ indicates the luminance average value of the target infrared image.

Correspondingly, in the foregoing manner, the luminance channel of the image may be obtained based on the structure information, the contrast information, and the luminance average value of the image. It should be understood that the foregoing is merely an example, and the structure information, the contrast information, and the luminance average value of the image may be obtained in another manner.

It should be noted that the value in the foregoing formula may be a value corresponding to the entire image, or may be a value corresponding to an image block in the image. In the solution of embodiments of this application, image fusion may be performed in a unit of an image, or image fusion may be performed in a unit of an image block. This is not limited in embodiments of this application.

Optionally, the determining the target fused image based on a luminance channel of the target color image and a luminance channel of the target infrared image includes: determining a contrast of the target fused image based on a contrast of the target color image and/or a contrast of the target infrared image; and determining structure information of the target fused image based on the structure information of the target color image and/or the structure information of the target infrared image; and determining a luminance average value of the target fused image based on the luminance average value of the target color image and/or the luminance average value of the target infrared image.

For example, the determining a contrast of the target fused image based on a contrast of the target color image and/or a contrast of the target infrared image includes: using a larger contrast of the contrast of the target color image and the contrast of the target infrared image as the contrast of the target fused image.

The contrast $\hat{c}$ of the target fused image may satisfy the following formula:

$$\hat{c} = \max(c_{gt\_Vis}, c_{gt\_Nir}),$$

where $c_{gt\_Vis}$ represents the contrast of the target color image, and $c_{gt\_Nir}$ represents the contrast of the target infrared image.

When the larger contrast is used as the contrast of the target fused image, the target fused image may include more texture information.

For example, the determining a contrast of the target fused image based on a contrast of the target color image and/or a contrast of the target infrared image includes: using the contrast of the target infrared image as the contrast of the target fused image.

Generally, the contrast of the infrared image is larger, and the contrast of the infrared image is used as the contrast of the target fused image, so that the target fused image includes more texture information, and a processing speed is improved.

It should be understood that the determining a contrast of the target fused image based on a contrast of the target color image and/or a contrast of the target infrared image may also include: determining a contrast of an image block in the target fused image based on a contrast of an image block in the target color image and/or a contrast of an image block in the target infrared image.

For example, the determining structure information of the target fused image based on the structure information of the target color image and/or the structure information of the target infrared image includes: performing weighted averaging on the structure information of the target color image and the structure information of the target infrared image, and using an obtained result as the structure information of the target fused image.

A structure weight corresponding to the target color image and a structure weight corresponding to the target infrared image may be preset, or may be determined based on the contrast of the target color image and the contrast of the target infrared image.

For example, the structure weight corresponding to the target color image is determined based on the contrast of the target color image. The structure weight corresponding to the target infrared image is determined based on the contrast of the target infrared image. When a contrast is higher, the value of the structure weight is larger. In this way, it is obtained that an image with a high contrast in the target fused image occupies a large proportion of structure information, so that the fused image can include more texture information.

In this case, the structure information S of the target fused image may satisfy the following formula:

$$\hat{s} = \frac{w(c_{gt\_Vis}) \times s_{gt\_Vis} + w(c_{gt\_Nir}) \times s_{gt\_Nir}}{w(c_{gt\_Vis}) + w(c_{gt\_Nir})},$$

where $w(\ )$ represents a function for calculating a structure weight, $s_{gt\_Vis}$ represents the structure information of the target color image, $w(c_{gt\_Vis})$ represents the structure weight that corresponds to the target color image and is determined based on the contrast of the target color image, $s_{gt\_Nir}$ represents the structure information of the target infrared image, and $w(c_{gt\_Nir})$ represents the structure weight that corresponds to the target infrared image and is determined based on the contrast of the target infrared image.

In another example, the structure weight corresponding to the target color image and the structure weight corresponding to the target infrared image are determined based on a ratio of the contrast of the target color image to the contrast of the target infrared image.

For example, the determining structure information of the target fused image based on the structure information of the target color image and/or the structure information of the target infrared image includes: using the structure information of the target infrared image as the structure information of the target fused image.

Generally, in a scenario of infrared fill-in light, an infrared image has more structure information, and the structure information of the infrared image is used as the structure information of the target fused image, so that the fused image includes more texture information, and a processing speed is improved.

It should be understood that the determining structure information of the target fused image based on the structure information of the target color image and/or the structure information of the target infrared image may also include: determining structure information of an image block in the target fused image based on structure information of an image block in the target color image and/or structure information of an image block in the target infrared image.

For example, the determining a luminance average value of the target fused image based on the luminance average value of the target color image and/or the luminance average value of the target infrared image includes: using the luminance average value of the target color image as the luminance average value of the target fused image.

In this way, it can be ensured that color in the fused image is not distorted, and a fused image with natural color is obtained.

For example, the determining a luminance average value of the target fused image based on the luminance average value of the target color image and/or the luminance average value of the target infrared image includes: performing weighted averaging on the luminance average value of the target color image and the luminance average value of the target infrared image, and using a result obtained after the weighted averaging as the luminance average value of the target fused image.

For example, a luminance weight corresponding to the target color image and a luminance weight corresponding to the target infrared image may be preset.

It should be understood that the determining a luminance average value of the target fused image based on the luminance average value of the target color image and/or the luminance average value of the target infrared image may also include: determining a luminance average value of image blocks in the target fused image based on a luminance average value of image blocks in the target color image and/or a luminance average value of image blocks in the target infrared image.

The target fused image may be obtained from the contrast, the structure value, and the luminance average value of the target fused image.

For example, the target fused image $y_{fuse}$ satisfies the following formula:

$$y_{fuse} = \hat{c} \times \hat{s} + l_{gt\_Vis}.$$

Optionally, the difference between the target fused image and the luminance channel of the image outputted by the image fusion model may be determined by using a structural similarity index (structural similarity index measure, SSIM) between the two images. When the SSIM is larger, a structural similarity between two images is higher. SSIM-based loss (loss) constraints enable an output image to maintain as much structure information as possible.

For example, the first loss function Lfuse satisfies the following formula:

$$L_{fuse} = 1 - SSIM(y_{fuse}, y_{out}),$$

where $y_{out}$ represents a luminance channel of an output image of the image fusion model.

Further, when the method 700 includes step S720 or the training sample includes the first background reference image, the first background reference image is added as an input of the image fusion model.

Further, when the method 700 includes step S730 or the training sample includes the first fusion weight, the first fusion weight is added as an input of the image fusion model.

Optionally, the determining the target fused image based on the target color image and the target infrared image may include: determining the target fused image based on the first fusion weight, the target color image, and the target infrared image.

For example, the determining the target fused image based on the first fusion weight, the target color image, and the target infrared image may include: determining a supervised image based on the target color image and the target infrared image, and weighting the supervised image and the target color image based on the first fusion weight.

Alternatively, it may be understood that the ratio of the supervised image and the target color image in the target fused image is adjusted based on the first fusion weight.

The supervised image may be determined in the foregoing manner of determining the target fused image $y_{fuse}$. That is, the target fused image $y_{fuse}$ is used as the supervised image.

For example, the adjusting, based on the first fusion weight, the ratio of the supervised image and the target color image in the target fused image includes: adjusting, based on the first fusion weight, a ratio of a luminance channel of the supervised image and a luminance channel of the target color image in the target fused image, and using an adjustment result as the target fused image.

As described above, the first fusion weight may correspond to a part of the image outputted by the image fusion model. The plurality of first fusion weights respectively correspond to different locations in the target fused image. In other words, the plurality of first fusion weights are respectively used to indicate proportions of the supervised image and the target color image in different locations in the target fused image.

For example, when a proportion of a supervised image in an area of the target fused image is larger, more information of the supervised image is included in the area, that is, the area of the target fused image is more similar to the area of the supervised image. When a proportion of a supervised image in an area of the target fused image is smaller, more information about the target color image is included in the area, that is, the area of the target fused image is more similar to the area of the target color image.

If the first color image and the first infrared image are images shot at night, and the foregoing target fused image $y_{fuse}$ is used as the supervised image, the supervised image includes more information of the infrared image. In this case, when more information of a supervised image is included in an area, it may also be understood that more information of the infrared image is included in the area.

For example, the first fusion weight may be a fusion weight map.

For example, the target fused image yfuse_adj satisfies the following formula:

$$y_{fuse\_adj}=y_{fuse}\times IN\_FuseMap+(1-IN\_FuseMap)\times y_{gt\_vis},$$

where IN_FuseMap indicates the fusion weight map. Values in different areas in the fusion weight map respectively indicate weights corresponding to the different areas of the image. For example, in the first item on the right of the equal sign in the foregoing formula, multiplying $y_{fuse}$ by the fusion weight map may be understood as multiplying pixel values in $y_{fuse}$ by weights corresponding to areas in which the pixel values are located in the fusion weight map.

For example, the difference between the target fused image and the luminance channel of the image outputted by the image fusion model may be determined by using an SSIM between the two images. When the SSIM is larger, a structural similarity between two images is higher.

For example, the first loss function $L_{fuse\_adj}$ may satisfy the following formula:

$$L_{fuse\_adj}=1-SSIM(y_{fuse\_adj},y_{out}).$$

For example, the target fused image is an image of a luminance channel, and the determining the target fused image based on the first fusion weight, the target color image, and the target infrared image may include: adjusting a ratio of the luminance channel of the target color image and the luminance channel of the target infrared image in the target fused image based on the first fusion weight, and using an adjustment result as the target fused image.

In some embodiments, when there is no target infrared image in the training sample, the target fused image may alternatively be determined based on the target color image and the first infrared image. A determining method is the same as that of the target infrared image, and details are not described herein again. In this way, when a signal-to-noise ratio of the first infrared image is high, a training effect of the image fusion model is ensured, storage space of a training sample is saved, and storage pressure is reduced.

Optionally, the loss function further includes a second loss function. The second loss function is for indicating a difference between the target color image and the image outputted by the image fusion model.

Reducing the value of the second loss function is continuously optimizing a parameter of the image fusion model, to reduce the difference between the image outputted by the image fusion model and the target color image. The training process may be understood as a noise reduction task. The second loss function may be understood as a loss function corresponding to the noise reduction task.

For example, the second loss function $L_{denoise}$ may satisfy the following formula:

$$L_{denoise}=\Sigma_{p\in P}\Sigma_{c\in C}|Gt_{vis}-Out|,$$

where P represents a set of pixels in different locations, p represents pixels in the pixel set, C represents different color channels of RGB, c represents one channel in the color channels of RGB, $Gt_{vis}$ represents the target color image, and Out represents the image outputted by the image fusion model.

The image outputted by the loss-constrained image fusion model is similar to the target color image as much as possible. This can ensure a noise reduction effect and ensure that color of the output image is consistent with that of the target color image, thereby avoiding a problem that the color of the output image is incorrect.

Optionally, the noise reduction task and the fusion task are implemented collaboratively.

For example, a loss function L of the image fusion model may satisfy the following formula:

$$L=L_{denoise}+\gamma L_{fuse\_adj},$$

where $\gamma$ is a parameter, for ensuring that the loss function $L_{denoise}$ of the noise reduction task and the loss function $L_{fuse\_adj}$ of the fusion task are in a same order of magnitude.

It should be understood that the formula is described only by using an example in which the loss function of the fusion task is $L_{fuse\_adj}$, and constitutes no limitation on the solution in embodiments of this application. Alternatively, the loss function of the fusion task may be Lfuse in step S740.

Noise of an image acquired in a low-illumination scene is high, and noise reduction processing is usually performed on the image before or after image fusion, for example, filtering using a filter. However, in this manner, the noise reduction task and the fusion task affect each other. As a result, a fusion effect in the output image is poor, or a noise reduction effect is poor, and image quality cannot be ensured. According to the solution in embodiments of this application, a noise reduction task and a fusion task are executed collaboratively, thereby reducing an information loss. This can ensure that rich texture details are retained in the fused image and ensure that the fused image reaches high resolution and real color information.

In the solution in embodiments of this application, a color image has rich color information, an infrared image has more texture information, and a fused image obtained by fusing the color image and the infrared image has natural color and rich texture information. The target fused image is determined according to the target color image and the target infrared image, and the image fusion model is trained based on the target fused image, so that the image fusion model can fully use infrared information. This helps fuse more texture information in the output image and retain more image details.

In addition, different application scenarios may have different requirements on image fusion, and a fused image obtained by performing fusion using a same image fusion model cannot satisfy fusion requirements of different application scenarios. A fusion ratio of a color image and an infrared image can be adjusted by introducing a fusion weight, thereby facilitating application to different application scenarios. In other words, it is not necessary to separately train a plurality of image fusion models for different application scenarios, and one image fusion model can be applied to different scenarios only by adjusting a fusion weight, thereby improving freedom of using the model.

In addition, different areas in a same image may have different image fusion requirements. For example, for a portrait in an image, a human face area tends to fuse more infrared information to retain more texture information, and a human body area tends to fuse more color information to ensure color authenticity of an output image. In embodiments of this application, different areas correspond to different fusion weights, to satisfy image fusion requirements of different areas in a same image, thereby helping improve image quality of an output image.

In addition, the background reference image is added as an input of the image fusion model, and the image fusion model is trained based on the background reference image, so that a background blur problem that may be caused by a flashlight effect of an infrared image can be resolved, and background quality of an output image can be greatly improved, that is, both foreground area quality and background area quality of the output image are enhanced, to implement full-picture image enhancement.

Active fill-in light is used in an infrared image, and a flashlight effect exists. As shown in (b) of FIG. 5, a phenomenon that a center of a picture is bright and an edge of the picture is dark is presented in the infrared image. In addition, an infrared image is prone to an overexposure problem. To ensure image quality of a fill-in light central area, brightness of a surrounding area is usually reduced. As a result, a signal-to-noise ratio difference between a foreground and a background of the infrared image is large, a signal-to-noise ratio of a central area is high, and a signal-to-noise ratio of a surrounding area is low. If the infrared image is directly used as a reference input of an image fusion task in a low-illumination scene, a background of an output result may be blurry.

An embodiment of this application provides a training method 800 for an image fusion model. A background reference image is added as an input of the image fusion model, to improve a training effect of the image fusion model.

The method 800 may be performed by a training apparatus for an image fusion model. The training apparatus for an image fusion model may be a cloud service device, or may be a terminal device, for example, an apparatus whose computing capability is sufficient to perform the training method for an image fusion model, such as a computer or a server, or may be a system including a cloud service device and a terminal device. For example, the method 800 may be performed by the training device 120 in FIG. 1, the neural network processor 30 in FIG. 3, the execution device 410 in FIG. 4, or a local device.

For example, the method 800 may be specifically performed by a local device in FIG. 4, and the local device may be a monitoring device. Specifically, the method 800 may be performed by a calculation module on the monitoring device.

The method 800 includes step S810 and step S820. The following describes step S810 and step S820 in detail.

Step S810: Obtain a first background reference image, a first color image, and a first infrared image.

A similarity between the first background reference image and the first color image is greater than a second threshold.

A background area in the first background reference image is the same as a background area in the first color image. That the similarity between the first background reference image and the first color image is greater than a second threshold may be that a similarity between the background area in the first background reference image and the background area in the first color image is greater than the second threshold. The background area may be determined by using the prior art. This is not limited in embodiments of this application.

A background signal-to-noise ratio of the first background reference image is greater than a background signal-to-noise ratio of the first color image. The first color image is an input of the image fusion model.

The first color image and the first infrared image are shot for a same scene. The same scene means that a similarity between the first color image and the first infrared image is greater than a first threshold, the first color image is an image formed by reflection of visible light by the scene, and the first infrared image is an image formed by reflection of light in an infrared band by the scene.

For example, the first background reference image may be a color image, or may be a grayscale image. In other words, the first background reference image may be inputted into the image fusion model in a form of a color image, or may be inputted into the image fusion model in a form of a grayscale image.

The background reference image may be obtained in a plurality of manners. The following uses an example to describe a manner of obtaining the background reference image. The background reference image may be obtained in any one of the following manners. It should be understood that the following is merely an example, and the background reference image may alternatively be obtained in another manner. This is not limited in this application. The first background reference image is a background reference image corresponding to the first color image, and may be obtained in any one of the following manners.

For example, the background reference image is determined based on the similarity to the color image.

For example, a similarity between an image in a gallery and a color image is determined. An image that is in the gallery and has the highest similarity to the color image is used as the background reference image. The gallery may be a high-definition image gallery. For example, a signal-to-noise ratio of an image in the gallery is greater than a signal-to-noise ratio of the color image.

For example, the similarity between the two images may be determined by using a parameter such as an SSIM.

Further, the background reference image is determined based on the similarity to a background area in the color image.

For example, a similarity between a background area in an image in the gallery and the background area in the color image is determined. An image that is in the gallery and has the highest similarity to the background area in the color image is used as the background reference image.

In another example, a long exposure image corresponding to the color image is used as the background reference image.

The long exposure image is an image shot in a long exposure manner.

The long exposure image corresponding to the color image is an image shot in a long exposure manner in a region in which the color image is shot. For example, the long exposure image corresponding to the color image may be an image shot in a long exposure manner at a location at which the color image is shot by a device for shooting the color image. The long exposure image is an image obtained when exposure duration is greater than a third threshold.

In another example, the background reference image of the color image is determined based on a plurality of color images corresponding to the color image.

The plurality of color images corresponding to the color image are images shot in a region in which the color image is shot. For example, the plurality of color images corresponding to the color image may be images shot at a location at which the color image is shot by a device for shooting the color image.

In another example, a result obtained after temporal noise reduction is performed on the color image is used as the background reference image of the color image.

Optionally, the method 800 may be applied to a video mode, that is, applied to a video fusion scenario.

In other words, the image fusion model obtained through training in the method 800 may be applied to a video scenario. For any frame in the video, image fusion may be performed by using the image fusion model obtained by using the method 800, to obtain a fused image/fused video.

For example, in this case, the background reference image may alternatively be obtained in any one of the following manners.

The first background reference image is a background reference image corresponding to the first color image, and may also be obtained in any one of the following manners.

For example, the background reference image is determined based on a plurality of frames of color images preceding the color image.

Because background areas of several consecutive frames of images are close, a background reference image corresponding to the color image may be obtained by using a plurality of consecutive frames of color images.

For example, a color image of a current input image fusion model is used as a target frame, a plurality of frames of color images preceding the target frame are accumulated to obtain an accumulated frame, and the accumulated frame is used as the background reference image of the target frame. The signal-to-noise ratio of the background area of the accumulated frame is good, and motion blur may exist in the foreground area.

For example, an average value of n frames of color images preceding the target frame is calculated to obtain an accumulated frame, and the accumulated frame is the background reference image of the target frame. n is an integer greater than 1. When the value of n is larger, the background area in the background reference image is clearer.

The background reference image $\text{Ref}_{cur}$ of the target frame may satisfy the following formula:

$$Ref_{cur} = \frac{1}{n}\sum\nolimits_{i=cur-n}^{cur} Frame_i,$$

where $Frame_i$ indicates the $i^{th}$ frame, and cur indicates a quantity of current frames, that is, the target frame is the $cur^{th}$ frame.

Alternatively, the accumulated frame is generated in a recursive manner.

It may also be understood that the background reference image of the target frame is determined based on the background reference image of a frame preceding the target frame.

For example, the background reference image $\text{Ref}_{cur}$ of the target frame may satisfy the following formula:

$$\text{Ref}_{cur} = \text{weight} \times \text{Ref}_{old} + (1-\text{weigh}) \times \text{Vis}_{cur},$$

where $\text{Ref}_{old}$ represents the background reference image of the frame preceding the target frame, or is an accumulated frame corresponding to frames preceding the target frame. $\text{Vis}_{cur}$ indicates a currently acquired color image, that is, a target frame, and weight indicates an accumulated weight. When the accumulated weight is larger, a background signal-to-noise ratio of the background reference image is higher, and motion blur is more obvious. (a) of FIG. 12 shows a grayscale image of the background reference image obtained when the accumulated weight is 0.5, and (b) of FIG. 12 shows a grayscale image of the background reference image obtained when the accumulated weight is 0.9. A signal-to-noise ratio of a background area in the background reference image in (b) of FIG. 12 is clearly higher than a signal-to-noise ratio of a background area in the background reference image in (a) of FIG. 12. The image fusion model can better suppress the motion blur problem. Therefore, the accumulated weight can be set to a higher value to produce a better effect on background improvement. For example, the accumulated weight is set to 0.9.

Generating the background reference image in a recursive manner can reduce image buffering and reduce storage pressure.

Although motion blur exists in a foreground area in the background reference image obtained by accumulating frames, a good complementary effect exists between the background reference image and the infrared image corresponding to the color image, and picture quality of the foreground area is not affected.

In another example, the long exposure frame preceding the target frame is used as the background reference image of the target frame. The long exposure frame is a frame shot in a long exposure manner. The long exposure frame is a frame obtained when the exposure duration is greater than the third threshold.

In another example, a background reference image of a previous frame is used as the background reference image of the target frame. In other words, a background reference image of a frame preceding the color image is used as the background reference image.

In this way, a feature of the previous background reference image can be reused, thereby reducing a calculation amount.

In another example, the fused image of the previous frame of the target frame is used as the background reference image of the target frame. In other words, a fused image that is of a frame preceding the color image and is outputted by the image fusion model is used as the background reference image.

For example, a frame A is inputted into the image fusion model as the first color image to obtain a fused frame A, the fused frame A is used as a background reference image of the frame A+1, and then the frame A+1 and the fused frame A are respectively inputted into the image fusion model as the first color image and the first background reference image.

In another example, a result obtained after temporal noise reduction is performed on the target frame is used as the background reference image of the target frame.

In most surveillance scenarios, the background seldom changes, and background parts of pictures are highly similar. For a scenario in which a location of a surveillance device remains unchanged, a color image shot in a case of high illumination may be used as a background reference image. For example, a color image shot in daytime with clear weather is used as a background reference image of a color image shot at night.

It should be understood that the foregoing manner of obtaining the background reference image is merely an example. This is not limited in this application.

Step S820: Train the image fusion model by using the first background reference image, the first color image, and the first infrared image as inputs of the image fusion model.

For example, the image fusion model includes an encoder (encoder) network and a decoder (decoder) network.

The encoder network is configured to extract features of an input image, and the decoder network is configured to obtain a fused image based on the extracted features. The fused image is a fusion result of the first color image.

The encoder network may use a neural network, for example, a convolutional neural network. The decoder network may use a neural network, for example, a convolutional neural network.

For example, the encoder network includes a first encoder, a second encoder, and a third encoder.

The first encoder is configured to extract a feature of the background reference image, the second encoder is configured to extract a feature of an inputted color image, and the third encoder is configured to extract a feature of an inputted infrared image.

It should be noted that the first encoder, the second encoder, and the third encoder may be a same encoder, or may be different encoders.

For example, the first encoder is configured to extract a feature of the background reference image, and the second encoder and the third encoder are a same encoder, configured to extract the features of the inputted color image and the inputted infrared image.

Figure 13:
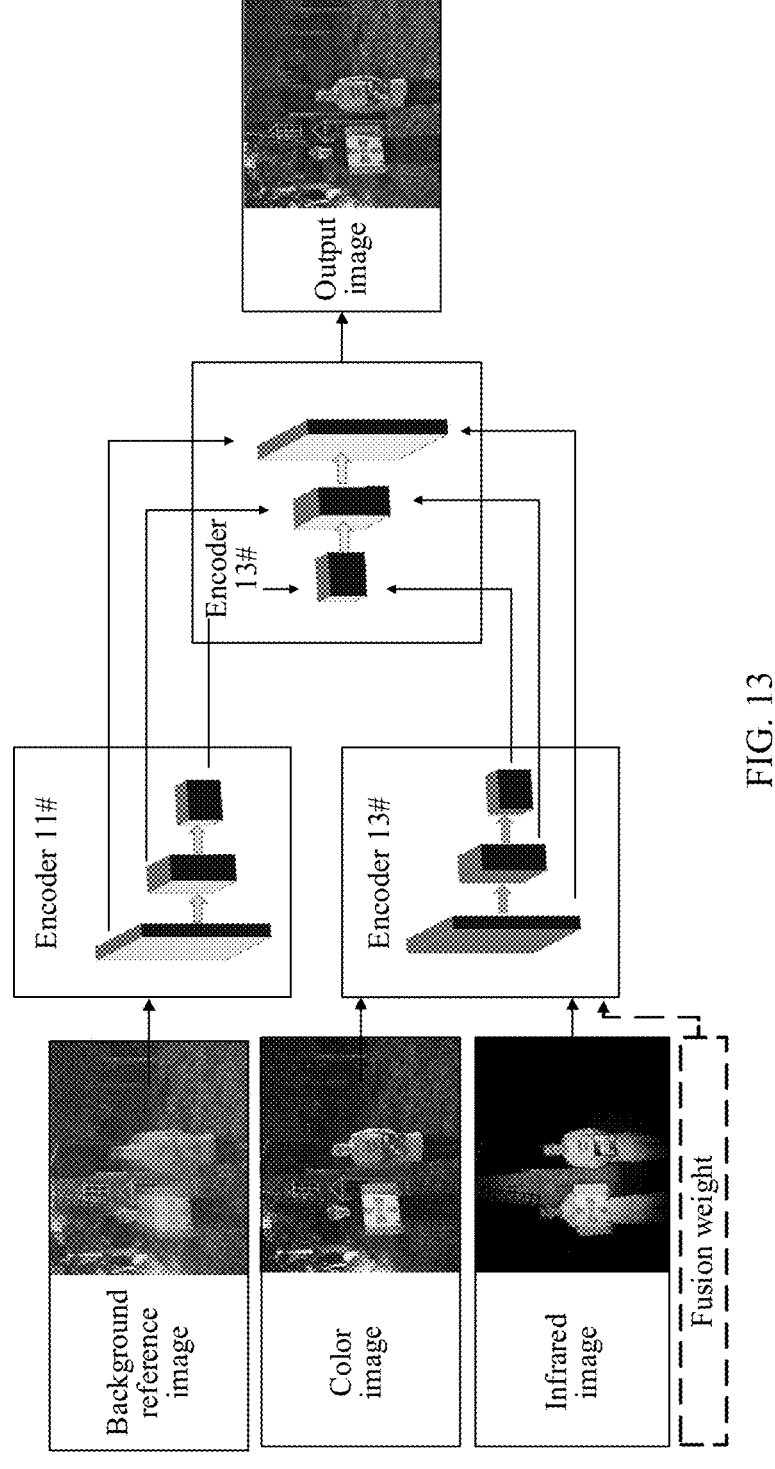
FIG. 13 is a schematic block diagram of an image fusion model according to an embodiment of this application.

As shown in FIG. 13, the background reference image is inputted into an encoder 11 #(an example of the first encoder) in the fusion model, and the encoder 11 #extracts the feature of the background reference image, and inputs the feature into a decoder 12 #. The color image and the infrared image are inputted into the encoder 13 #(an example of the second encoder, or may be understood as an example of the third encoder), and the encoder 13 #extracts the features of the inputted color image and the inputted infrared image, and inputs the features into the decoder 12 #. The decoder 12 #reconstructs the fused image based on the input features. Each of the encoder 11 #, the encoder 13

, and the decoder 12 #may be a convolutional neural network. For example, the inputted color image may be a first color image, and the inputted infrared image may be a first infrared image.

Optionally, the method 800 may be applied to a video mode, that is, applied to a video fusion scenario.

Further, a feature of a background reference image of a previous frame of the first color image may be used as the feature of the first background reference image. In other words, a feature of one frame of background reference image is reused in an image fusion process of a plurality of frames of color images.

As described above, background reference images of different frames in a video may be the same. For example, a color image shot in daytime with clear weather is used as a background reference image of a color image shot at night.

For example, the frame A, a background reference image A, and an infrared image A are inputted into the image fusion model, features of the frame A, the background reference image A, and the infrared image A are separately extracted, and then a fused image, that is, a fusion result of the frame A, is obtained through reconstruction based on the extracted features. The frame A+1 and an infrared image A+1 are inputted into the image fusion model, features of the frame A+1 and the infrared image A+1 are separately extracted, the feature of the background reference image A is used as a feature of the background reference image of the frame A+1, and then a fused image, that is, a fusion result of the frame A+1, is obtained through reconstruction based on the extracted features.

In this way, it is not necessary to extract a feature of a background reference image in each fusion process. Therefore, a calculation amount is reduced, hardware overheads can be reduced while imaging quality is ensured, and image fusion can still be implemented when computing resources of a device are limited.

For example, the encoder network includes M first encoders and N second encoders, and the decoder network includes N decoders. That is, the image fusion model includes M first encoders, N second encoders, and N decoders. M is a positive integer, N is a positive integer greater than 1, and N>M.

The first color image may include N frames of color images, and the first infrared image may include N frames of infrared images corresponding to the N frames of color images.

The N frames of color images and the N frames of infrared images are used as inputs of the image fusion model, and the image fusion model may output a fused image corresponding to the N frames of color images, which specifically includes the following steps.

(1) Features of the N frames of color images and features of the N frames of infrared images are separately extracted.

For example, the N frames of color images and the N frames of infrared images are respectively inputted into the N second encoders, and the N second encoders respectively extract the features of the N frames of color images and the features of the N frames of infrared images, and respectively input the features of the N frames of color images and the features of the N frames of infrared images into the N decoders.

(2) Features of the M background reference images are separately extracted.

For example, the M background reference images corresponding to the M frames of color images in the N frames of color images are respectively inputted into the M first encoders, and the M first encoders respectively extract features of the M background reference images, and respectively input the features of the M background reference images into the N decoders, so that each decoder receives a feature of one of the M background reference images.

For example, for each decoder, a color image whose quantity of frames is closest to that of a color image received by the decoder is selected from the M frames of color images, and a background reference image of the closest color image is inputted into the decoder.

For example, for the decoder A, the feature inputted into the decoder A in step (1) is the feature of the frame A and the feature of the infrared image corresponding to the frame A. If the frame A is one of the M frames of color images, the feature of the background reference image of the frame A is inputted into the decoder A in step (2). If the frame A does not belong to the M frames of color images, in step (2), a feature of a background reference image of a color image that is in the M frames of color images and whose quantity of frames is closest to that of the frame A is inputted into the decoder A.

(3) N fused images are separately reconstructed based on the features of the N frames of color images, the features of the N frames of infrared images, and the features of the M background reference images.

For example, the N decoders separately obtain the N fused images by means of reconstruction based on features inputted into the N decoders. The features inputted into the N decoders include features of the N frames of color images, features of the N frames of infrared images, and features of the M background reference images.

Figure 14:
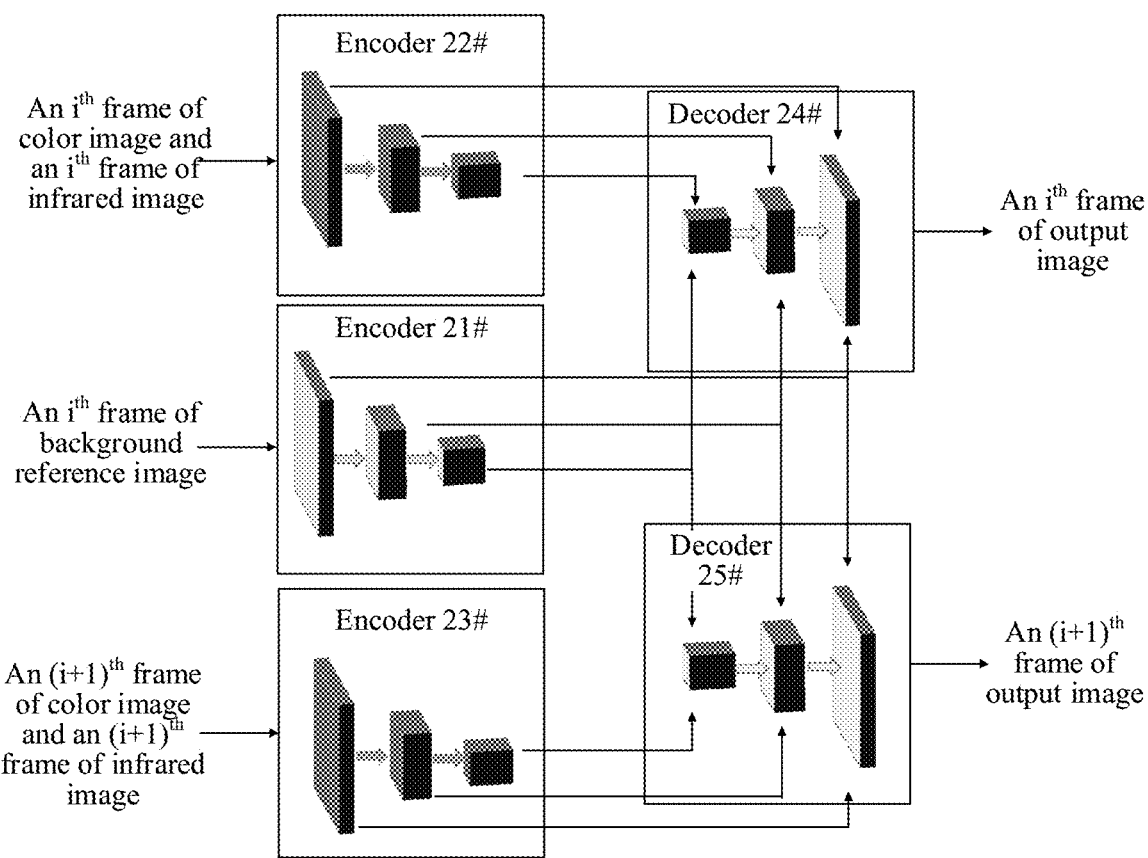
FIG. 14 is a schematic block diagram of another image fusion model according to an embodiment of this application.

For example, the image fusion model includes one first encoder, two second encoders, and two decoders. As shown in FIG. 14, an encoder network includes an encoder 21 #(an example of a first encoder), an encoder 22 #, and an encoder 23 #(an example of a second encoder), and a decoder network includes a decoder 24 #and a decoder 25 #(an example of a decoder). An $i^{th}$ frame of color image of and an $i^{th}$ frame of the infrared image are inputted into the encoder 22 #, and the encoder 22 #extracts features of the $i^{th}$ frame of color image and the $i^{th}$ frame of infrared image, and inputs the features into the decoder 24 #. An $(i+1)^{th}$ frame of color image and an $(i+1)^{th}$ frame of infrared image are inputted into the encoder 23 #, and the encoder 23 #extracts features of the $(i+1)^{th}$ frame of color image and the $(i+1)^{th}$ frame of infrared image, and inputs the features into the decoder 25 #. An $i^{th}$ frame of background reference image is inputted into the encoder 21 #, and the encoder 21 #extracts a feature of the background reference image, and inputs the feature into the decoder 24 #and the decoder 25 #. The decoder 24 #reconstructs, based on the features extracted by the encoder 22 #and the encoder 21 #, to obtain a fused image, that is, an $i^{th}$ frame of output image. The decoder 25 #reconstructs, based on the features extracted by the encoder 23 #and the encoder 21 #, to obtain a fused image, that is, an $(i+1)^{th}$ frame of output image. That is, the feature of the $i^{th}$ frame of background reference image is reused for image fusion of the $i^{th}$ frame and the $(i+1)^{th}$ frame. In this way, image fusion may be performed on the two frames at the same time, thereby improving a processing speed. In addition, features of the background reference image do not need to be extracted twice, thereby reducing a calculation amount. When an effect is basically lossless, overheads of the solution can be reduced by 25%.

A quantity of encoders and a quantity of decoders are increased, so that a plurality of frames of images can be fused at the same time, thereby improving a processing speed, and a feature of the background reference image is reused, thereby reducing a calculation amount in a process of extracting the feature of the background reference image, and reducing hardware overheads.

It should be noted that the image fusion model in step S820 is merely an example, and another model that can implement image fusion may also be used as the image fusion model in embodiments of this application.

For example, for a training process, refer to the foregoing method 700. Details are not described herein again.

It should be noted that another training method instead of the foregoing method 700 may be used in the training process. This is not limited in this application.

According to the solution in embodiments of this application, the background reference image is added as an input of the image fusion model, and the image fusion model is trained based on the background reference image, so that a background blur problem that may be caused by a flashlight effect of an infrared image can be resolved, and background quality of an output image can be greatly improved, that is, both foreground area quality and background area quality of the output image are enhanced, to implement full-picture image enhancement.

An embodiment of this application provides a training method 900 for an image fusion model, to adjust an output image by increasing a fusion weight, to satisfy different application scenarios.

The method 900 may be performed by a training apparatus for an image fusion model. The training apparatus for an image fusion model may be a cloud service device, or may be a terminal device, for example, an apparatus whose computing capability is sufficient to perform the training method for an image fusion model, such as a computer or a server, or may be a system including a cloud service device and a terminal device. For example, the method 900 may be performed by the training device 120 in FIG. 1, the neural network processor 30 in FIG. 3, the execution device 410 in FIG. 4, or a local device.

For example, the method 900 may be specifically performed by a local device in FIG. 4, and the local device may be a monitoring device. Specifically, the method 900 may be performed by a calculation module on the monitoring device.

The method 900 includes step S910 and step S920. The following describes step S910 and step S920 in detail.

Step S910: Obtain a first fusion weight, a first color image, and a first infrared image.

The first fusion weight is for weighting the first color image and the first infrared image.

The first fusion weight is for adjusting a fusion ratio of the first color image and the first infrared image in the image outputted by the image fusion model.

For example, the first fusion weight may be in a parameter form, or may be in an image form, that is, a fusion weight map. That is, the first fusion weight may be inputted into the image fusion model in a form of a parameter, or may be inputted into the image fusion model in a form of an image.

The first fusion weight may correspond to a part or all of the image outputted by the image fusion model. That is, the first fusion weight may be a global weight.

The first fusion weight may correspond to a part of the image outputted by the image fusion model. That is, the first fusion weight may be a local weight. Different first fusion weights respectively correspond to different areas in the output image.

The first fusion weight may be obtained in a plurality of manners. The following uses an example to describe a manner of obtaining the first fusion weight. The first fusion weight may be obtained in any one of the following manners. It should be understood that the following is merely an example, and the first fusion weight may alternatively be obtained in another manner. This is not limited in this application.

Manner 1: The first fusion weight may be preset. For example, the first fusion weight may be manually set.

Manner 2: The first fusion weight is determined based on the intensity of the infrared image.

For example, a plurality of first fusion weights may be set, and the plurality of first fusion weights are determined based on luminance values of different areas of the infrared image. Specifically, an area with higher luminance in the infrared image corresponds to a higher first fusion weight. Because an area with higher luminance has a higher signal-to-noise ratio, a weight value may be adaptively adjusted based on the intensity of the infrared image, and a higher weight is set in an area with higher luminance, which helps improve quality of the fused image.

The infrared image may be the first infrared image, or may be the target infrared image.

Manner 3: The first fusion weight is determined based on information entropy of the color image and information entropy of the infrared image.

Values of the plurality of first fusion weights are determined based on the information entropy of the color image and the information entropy of the infrared image.

For example, if information entropy at an area A of the infrared image is greater than information entropy at an area A of the color image, a weight value corresponding to the infrared image at the area A is high. If information entropy at an area B of the infrared image is less than information entropy at an area B of the color image, a weight value corresponding to the infrared image at the area B is low.

The infrared image may be the first infrared image, or may be the target infrared image.

The color image may be a first color image, or may be a target color image.

An information entropy source includes but is not limited to gradient information, contrast information, and the like.

Generally, when information entropy of an image is larger, an image is clearer. A weight value is adaptively adjusted by using the information entropy of the image, to obtain a first fusion weight, so that an area with higher information entropy corresponds to a larger weight, thereby helping improve quality of the fused image.

Manner 4: The first fusion weight is determined based on human face information.

Specifically, a large weight value of the infrared image may be set at a human face area, and a small weight value of the infrared image is set at another area other than the human face area, that is, a weight value of the color image is high.

A manner of obtaining the human face area includes but is not limited to a manner such as human face detection, image segmentation, or a human face heatmap.

The infrared image may be the first infrared image, or may be the target infrared image.

The infrared image includes more image information, that is, includes more texture information. Therefore, a large weight value of the infrared image is set at the human face area, more infrared information can be fused in the human face area, and more details can be retained, thereby improving the definition of the human face area and helping improve accuracy of facial recognition. A color image has more realistic color. Therefore, a small weight value of the infrared image is set in another area, so that more color information can be fused in the another area, a natural degree of color in the another area is ensured, and an effect of the fused image is more natural.

Figure 15:
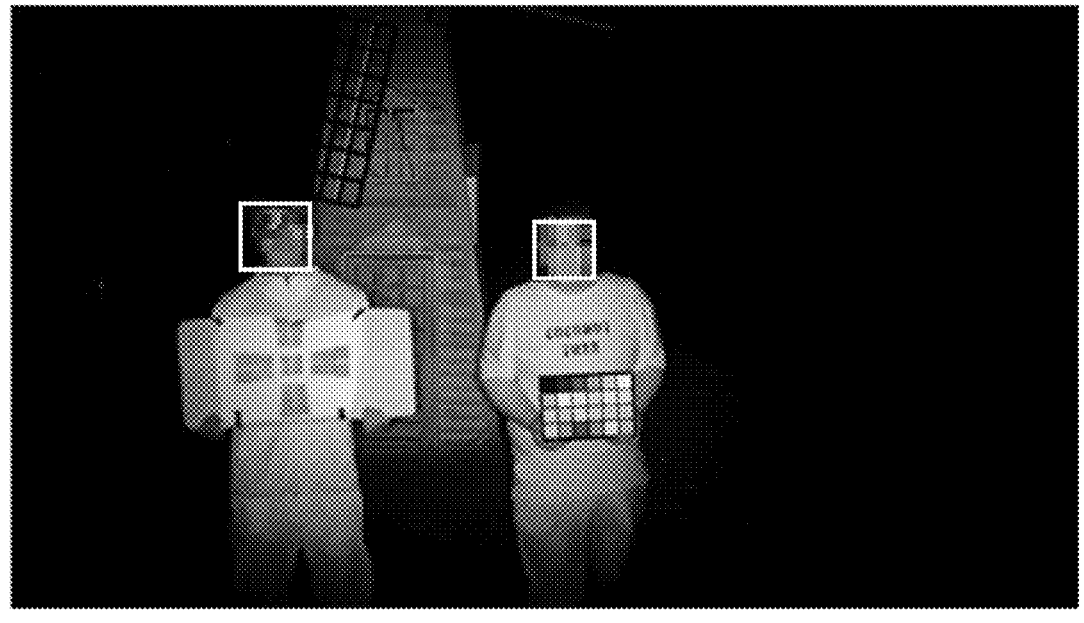
FIG. 15 is a schematic diagram of a method for obtaining a fusion weight according to an embodiment of this application.
Figure 15:
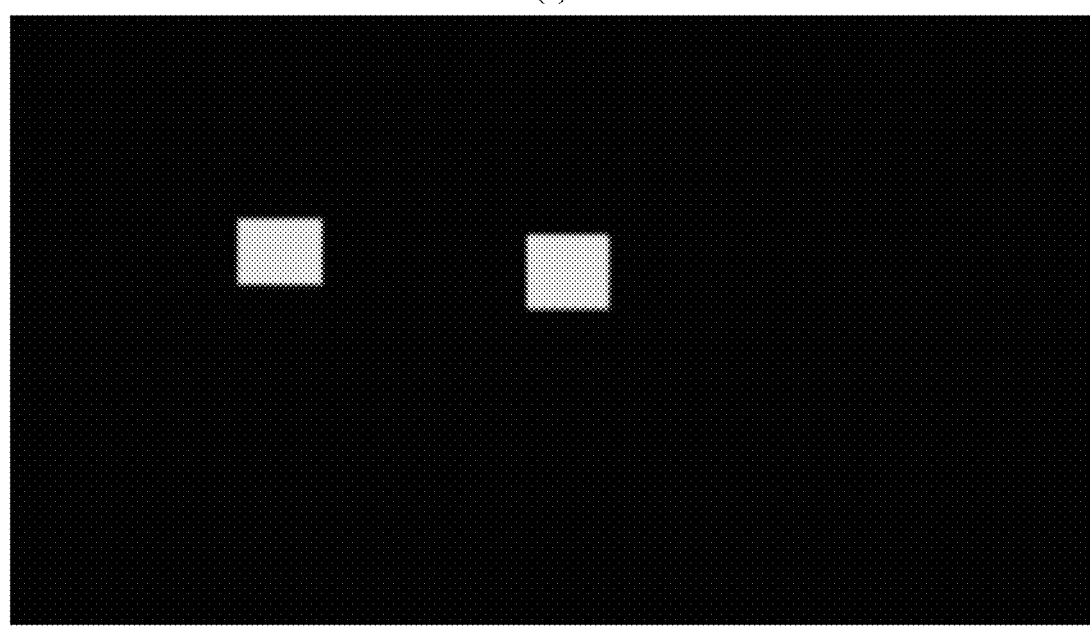

FIG. 15 is a schematic diagram of a method for obtaining a fusion weight. For example, the method may be applied to a human face checkpoint surveillance scenario.

Specifically, a human face area in (a) of FIG. 15 is obtained, and a weight fused image is generated based on the human face area, as shown in (b) of FIG. 15. A weight of the human face area is greater than those of other areas. The weight value is for indicating a proportion of the infrared image in the fused image. A weight of a human face area in (b) of FIG. 15 is 0.6, and weights of other areas are 0.1.

For example, the human face area may be a human face box, for example, a rectangular box in FIG. 15. Alternatively, the human face box may be of another shape, for example, a circular box or an irregular box.

The image for human face detection may be a color image, for example, a first color image, or may be an infrared image, for example, a first infrared image. Human face detection may be performed on a color image to obtain a human face box, or human face detection may be performed on an infrared image to obtain a human face box. For example, (a) of FIG. 15 shows human face detection performed on an infrared image.

It should be understood that, in FIG. 15, that the first fusion weight is represented only in a form of a fusion weight map is used as an example, and does not constitute a limitation on the solution in embodiments of this application. The first fusion weight may alternatively be represented in another form, for example, the first fusion weight is represented in a form of a parameter value.

It should be noted that in FIG. 15, only an example in which the first fusion weight indicates a weight value of the infrared image is used for description, and does not constitute a limitation on the solution in embodiments of this application. The first fusion weight may be further used to indicate a weight value of a color image, or the like.

Step S920: Train the image fusion model by using the first fusion weight, the first color image, and the first infrared image as inputs of the image fusion model.

For example, for a training process, refer to the foregoing method 700. Details are not described herein again.

It should be noted that another training method instead of the foregoing method 700 may be used in the training process. This is not limited in this application.

For example, the method 800 and the method 900 may be used in combination. To be specific, the first fusion weight, the first background reference image, the first color image, and the first infrared image are used as inputs of the image fusion model, to train the image fusion model. For example, the image fusion model in FIG. 13 is used to input the first fusion weight, the first infrared image, and the first color image into the second encoder, and input the first background reference image into the first encoder, to train the image fusion model.

Different application scenarios may have different requirements on image fusion, and a fused image obtained by performing fusion using a same image fusion model cannot satisfy fusion requirements of different application scenarios. A fusion ratio of a color image and an infrared image can be adjusted by introducing a fusion weight, thereby facilitating application to different application scenarios. In other words, it is not necessary to separately train a plurality of image fusion models for different application scenarios, and one image fusion model can be applied to different scenarios only by adjusting a fusion weight, thereby improving freedom of using the model.

For example, a recognition rate is more significant for a human face area, in which more infrared information tends to be fused, so that a fusion result is closer to an infrared path. Color accuracy is more significant for a human body area, in which an infrared image tends to be used as a noise reduction reference, so that a fusion result is closer to a color path, and naturalness of an image is improved. According to the solution in embodiments of this application, different fusion processing is performed on different locations in the image based on the fusion weight, to help improve imaging quality of the image in a targeted manner.

In addition, reference values of infrared images in different areas are different for image fusion is. Fusion weights of the infrared images at different locations are adjusted, so that it can be ensured that a background signal of the image does not deteriorate while foreground definition is improved by using the infrared image, that is, impact caused by a flash-light effect of the infrared image on a background area is reduced. For example, the fusion weight of the infrared image in the foreground area is increased, so that the foreground area in the fused image can fuse more information of the infrared image; and the fusion weight of the infrared image in the background area is decreased, so that the background area in the fused image can fuse more information of the color image.

An embodiment of this application provides a schematic flowchart of an image fusion method 1000. The method may be performed by an apparatus or a device that can perform image fusion. The apparatus that can perform image fusion may be a cloud service device, or may be a terminal device, for example, an apparatus whose computing capability is sufficient to perform the image fusion method, or may be a system including a cloud service device and a terminal device. For example, the method 1000 may be performed by the execution device 110 in FIG. 1, the neural network processor 30 in FIG. 3, the execution device 410 in FIG. 4, or a local device.

The method 1000 may be specifically performed by the execution device 110 shown in FIG. 1. A to-be-processed color image and an infrared image in the method 1000 may be inputted data provided by the client device 140 shown in FIG. 1. The preprocessing module 113 in the execution device 110 may be configured to perform the obtaining a background reference image in S1020 in the method 1000. The preprocessing module 114 in the execution device 110 may be configured to perform the obtaining a fusion weight in S1030 in the method 1000, and the calculation module 111 in the execution device 110 may be configured to perform the image fusion described in S1040 in the method 1000.

In another example, the method 1000 may be specifically performed by a local device in FIG. 4, and the local device may be a monitoring device. Specifically, the method 1000 may be performed by a calculation module on the monitoring device.

Optionally, the method 1000 may be processed by a CPU, or may be jointly processed by a CPU and a GPU, or may not use a GPU, but use another processor suitable for neural network computation. This is not limited in this application.

The image fusion model used in the image fusion method 1000 may be constructed by using the method in FIG. 10. The method 1000 includes step S1010 to step S1040. For a specific implementation of the method 1000, refer to the foregoing method 700. To avoid unnecessary repetition, repeated descriptions are properly omitted below when the method 1000 is described.

S1010: Obtain a to-be-processed color image and an infrared image.

The to-be-processed color image is an image formed by reflection of visible light by the scene, and the infrared image is an image formed by reflection of light in an infrared band by the scene.

The infrared image and the to-be-processed color image are shot for a same scene. A same scene means that a similarity between the to-be-processed color image and the infrared image is greater than a first threshold.

Alternatively, it may be understood that the "shot for a same scene" may be that the infrared image and the to-be-processed color image have same picture content. For example, the infrared image may be an infrared image shot in a same region at a same moment as the to-be-processed color image. For a manner of obtaining the color image and the corresponding infrared image, refer to FIG. 6 to FIG. 8. This is not limited in embodiments of this application.

S1020: Obtain a background reference image.

A similarity between the background reference image and the to-be-processed color image is greater than a second threshold.

A background area in the background reference image is the same as a background area in the to-be-processed color image. That the similarity between the background reference image and the to-be-processed color image is greater than a second threshold may be that a similarity between the background area in the background reference image and the background area in the to-be-processed color image is greater than the second threshold. A background signal-to-noise ratio of the background reference image is usually greater than a background signal-to-noise ratio of the to-be-processed color image. The background area may be determined by using the prior art. This is not limited in embodiments of this application.

Step S1020 is an optional step.

For a specific method for obtaining the background reference image, refer to the foregoing method 800.

For example, the background reference image may be inputted into the image fusion model in a form of a color image, or may be inputted into the image fusion model in a form of a grayscale image. For example, the background reference image is directly inputted into the image fusion model. In another example, a luminance channel of the background reference image may be inputted into the image fusion model.

S1030: Obtain a fusion weight.

The fusion weight is for weighting the to-be-processed color image and the infrared image.

In other words, the fusion weight is for adjusting a fusion ratio of the to-be-processed color image and the infrared image in the fused image. In other words, the fusion weight is for adjusting a ratio of an information amount of the to-be-processed color image included to an information amount of the infrared image in the fused image.

Step S1030 is an optional step.

For a specific manner of obtaining the fusion weight, refer the foregoing method 900.

Optionally, the first fusion weight may be a global weight.

For example, when the weight corresponding to the infrared image is larger, the fused image includes more information of the infrared image, that is, the fused image is more similar to the infrared image. When the weight corresponding to the to-be-processed color image is larger, the fused image includes more information of the to-be-processed color image, that is, the fused image is more similar to the to-be-referenced color image.

Optionally, the fusion weight corresponds to all fused images.

That the fusion weight corresponds to all of the fused image may be understood as that only one fusion weight is used in the entire fused image. The fusion ratio of the to-be-processed color image and the infrared image is the same in any area in the fused image. The fusion weight may also be referred to as a global weight.

Optionally, the fusion weight corresponds to a part of the fused image.

That the fusion weight corresponds to a part of the fused image may be understood as that the fusion weight corresponds to one area in the fused image. In this case, a plurality of fusion weights may be used, and the plurality of fusion weights respectively correspond to different areas in the fused image. The fusion weight may also be referred to as a local weight.

For example, a weight corresponding to an infrared image in an area A is large, and a weight corresponding to an infrared image in an area B is small. In the fused image, the area A includes a large amount of information of the infrared image, and the area B includes a large amount of the information of the to-be-processed color image. To be specific, the area A is more similar to the area A in the infrared image, and the area B is more similar to the area B in the to-be-processed color image.

For example, the fusion weight may be inputted into the image fusion model in a form of a parameter, or may be inputted into the image fusion model in a form of a fusion weight map. This is not limited in this application.

A value in the fusion weight map may be for indicating the fusion weight. For example, when a plurality of fusion weights are set, values of different areas in the fusion weight map may be for representing a plurality of fusion weights of different areas in a corresponding fused image.

The fusion weight is represented in a form of a fusion weight map, so that complexity of adjusting the fusion weight can be reduced. When a plurality of fusion weights are set, it is more helpful to represent, by using the fusion weight map, areas corresponding to the plurality of fusion weights. Especially when the areas corresponding to the plurality of fusion weight is of an irregular shape, a form of the fusion weight map is more conducive to representing different areas corresponding to the plurality of fusion weights.

S1040: Input the to-be-processed color image and the infrared image into the image fusion model for feature extraction, and perform image fusion based on extracted features to obtain a fused image.

The image fusion model is obtained by training an image fusion model using a first color image and a first infrared image as inputs of the image fusion model and using a target that a value of a loss function is less than a fourth threshold.

The loss function includes a first loss function, the first loss function is for indicating a difference between an image outputted by the image fusion model and a target fused image. The target fused image is determined based on a target color image and a target infrared image. The first color image, the first infrared image, the target color image, and the target infrared image are shot for the same scene. A signal-to-noise ratio of the target color image is greater than a signal-to-noise ratio of the first color image, and a signal-to-noise ratio of the target infrared image is greater than a signal-to-noise ratio of the first infrared image. The same scene means that a similarity between any two of the first color image, the first infrared image, the target color image, and the target infrared image is greater than a first threshold.

Optionally, the target fused image is an image of a luminance channel, and the difference between the image outputted by the image fusion model and the target fused image is a difference between a luminance channel of the image outputted by the image fusion model and the target fused image.

Optionally, the loss function further includes a second loss function, and the second loss function is for indicating a difference between the target color image and the image outputted by the image fusion model.

When the method 1000 includes step S1020, step S1040 further includes: inputting the background reference image into the image fusion model, to perform image fusion.

When the method 1000 includes step S1030, step S1040 further includes: inputting the fusion weight into the image fusion model to perform image fusion.

For a specific training process, refer to S740 in the method 700. Details are not described herein again.

According to the solution in embodiments of this application, the target fused image is determined by using the target color image and the target infrared image, and the image fusion model is trained based on the target fused image, so that the image fusion model can fully use infrared information. This helps fuse more texture information in the output image and retain more image details.

Figure 18:
FIG. 18 is a schematic diagram of a fusion result according to an embodiment of this application.
Figure 18:
Figure 18:

FIG. 18 is a schematic diagram of an effect of image fusion performed by using the method 1000. (a) of FIG. 18 is a color image obtained in a low-illumination scene, and illuminance in the scene is 0.2 Lux. As shown in the figure, a signal-to-noise ratio of the color image is low, and the human face area is blurry and almost cannot be recognized. (b) of FIG. 18 is an infrared image corresponding to the color image. An infrared image with high definition may be obtained by using near-infrared fill-in light. As shown in the figure, definition of a human face and a human body in the near-infrared image is high. However, the infrared image does not have color information, and a signal in the background area is almost 0 due to the flashlight effect of a strobe light. (c) of FIG. 18 is a fused image obtained by using the method 1000. As shown in the figure, the fused image fully combines advantages of a color image and a near-infrared image, and improves imaging quality of the fused image in a low-illumination scene.

Figure 19:
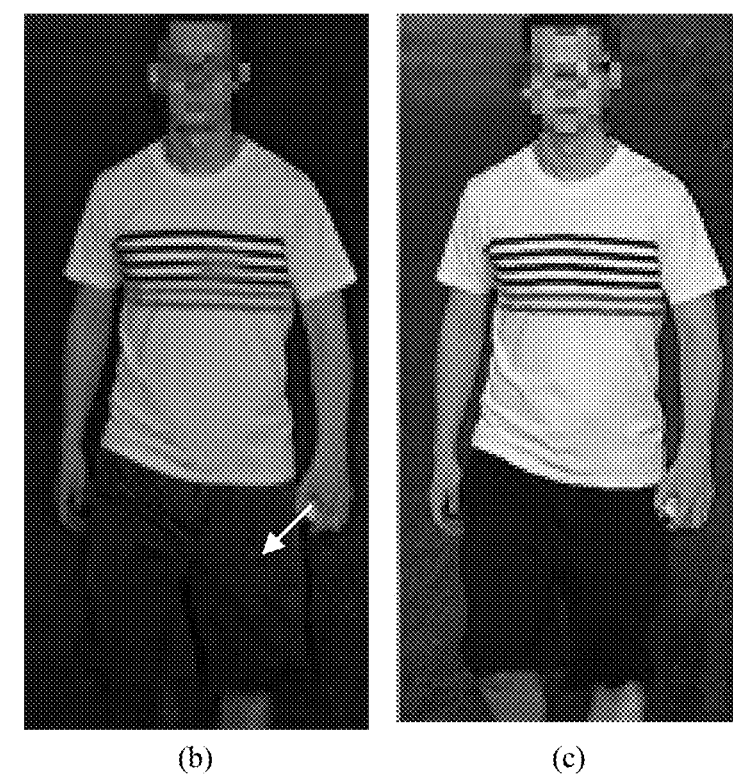
FIG. 19 is a comparison diagram of effects of fused images obtained by using different methods according to an embodiment of this application.

FIG. 19 is a comparison diagram of effects of image fusion performed by using different methods. (a) of FIG. 19 is a to-be-processed color image, a signal-to-noise ratio is low, and a human face area is blurry and almost unrecognizable. Because noise is high, the estimation of a white balance parameter of the image is inaccurate. As a result, the image has a yellow cast (white clothes have a yellow cast). (b) of FIG. 19 is a fused image obtained by using a conventional luminance fusion solution. This solution can improve a signal-to-noise ratio of a face part. However, as shown by an arrow in the figure, this solution causes color distortion in a human body area, and dark-color trousers have a color error of a gray cast. (c) of FIG. 19 is a fused image obtained by using the method 1000. Definition of a human face area in the fused image is improved, and real color of a human body area is maintained.

Table 1 shows test results of performing facial recognition on fused images obtained by using different methods.

For example, a similarity between a human face area in 1424 fused images and a standard identification photo in an illumination range of 0.2 Lux to 5 Lux is measured, and a human face recall status when the similarity is greater than 0.85 is calculated.

TABLE 1

| Imaging mode | Quantity of test objectives | >0.85 | >0.85, recall rate |
|---|---|---|---|
| Near infrared | 1424 | 425 | 29.85% |
| Conventional convergence | 1424 | 260 | 18.26% |
| Solution of this application | 1424 | 465 | 32.65% |

As shown in Table 1, in a fused image obtained by using a conventional brightness fusion solution, a facial recognition effect is the worst. The fused image obtained by using the solution in embodiments of this application combines advantages of an infrared image and a color image, and a facial recognition effect is the best.

It may be understood that the method 700 is a training phase (a phase performed by the training device 120 shown in FIG. 1) of the image fusion model, and specific training is performed by using the image fusion model provided in the method 700. The method 1000 may be understood as an application phase (a phase performed by the execution device 110 shown in FIG. 1) of the image fusion model, and may be specifically reflected as using the image fusion model obtained through training by using the method 700, and based on a to-be-processed color image and an infrared image that are inputted by a user, an output image, that is, a fused image, is obtained.

FIG. 16 shows another image fusion method 1100 according to an embodiment of this application. A background reference image is added as an input of an image fusion model, thereby improving imaging quality.

The method 1100 may be performed by the image fusion apparatus. The image fusion apparatus may be a cloud service device, or may be a terminal device, for example, an apparatus whose computing capability is sufficient to perform the image fusion method, such as a computer or a server, or may be a system including a cloud service device and a terminal device. For example, the method 1100 may be performed by the execution device 110 in FIG. 1, the neural network processor 30 in FIG. 3, the execution device 410 in FIG. 4, or a local device.

For example, the method 1100 may be specifically performed by a local device in FIG. 4, and the local device may be a monitoring device. Specifically, the method 1100 may be performed by a calculation module on the monitoring device.

For example, the image fusion model used in the image fusion method 1100 may be constructed by using the foregoing method 800. The method 1100 includes step S1110 to step S1120. For a specific implementation of the method 1100, refer to the foregoing method 800. To avoid unnecessary repetition, repeated descriptions are properly omitted below when the method 1100 is described.

Step S1110: Obtain a to-be-processed color image, an infrared image, and a background reference image.

A similarity between the background reference image and the to-be-processed color image is greater than a second threshold.

For example, a background area in the background reference image is the same as a background area in the to-be-processed color image. That the similarity between the background reference image and the to-be-processed color image is greater than a second threshold may be that a similarity between the background area in the background reference image and the background area in the to-be-processed color image is greater than the second threshold. A background signal-to-noise ratio of the background reference image is greater than a background signal-to-noise ratio of the to-be-processed color image.

The infrared image and the to-be-processed color image are shot for a same scene. A same scene means that a similarity between the to-be-processed color image and the infrared image is greater than a first threshold.

The similarity in embodiments of this application may be an image texture similarity. For example, the similarity between the to-be-processed color image and the infrared image may be an image texture similarity between the to-be-processed color image and the infrared image. The similarity between the background reference image and the to-be-processed color image may be an image texture similarity between the background reference image and the to-be-processed color image.

For example, the background reference image may be a color image, or may be a grayscale image. In other words, the background reference image may be inputted into the image fusion model in a form of a color image, or may be inputted into the image fusion model in a form of a grayscale image.

The background reference image may be obtained in a plurality of manners.

The method 1100 may be applied to a video mode, that is, applied to a video fusion scenario. For example, in this case, the background reference image may be obtained in any one of the following manners.

For example, the background reference image is determined based on a plurality of frames of color images preceding the to-be-processed color image.

For example, the to-be-processed color image of a current input image fusion model is used as a target frame, a plurality of frames of color images preceding the target frame are accumulated to obtain an accumulated frame, and the accumulated frame is used as the background reference image of the target frame. The signal-to-noise ratio of the background area of the accumulated frame is good, and motion blur may exist in the foreground area.

For example, an average value of n frames of color images preceding the target frame is calculated to obtain an accumulated frame, and the accumulated frame is the background reference image of the target frame. n is an integer greater than 1. When the value of n is larger, the background area in the background reference image is clearer.

The background reference image $Ref_{cur}$ of the target frame may satisfy the following formula:

$$Ref_{cur} = \frac{1}{n}\sum_{i=cur-n}^{cur} Frame_i,$$

where $Frame_i$ indicates the $i^{th}$ frame, and cur indicates a quantity of current frames, that is, the target frame is the $cur^{th}$ frame.

Alternatively, the accumulated frame is generated in a recursive manner.

It may also be understood that the background reference image of the target frame is determined based on the background reference image of a frame preceding the target frame.

For example, the background reference image $\text{Ref}_{cur}$ of the target frame may satisfy the following formula:

$$\text{Ref}_{cur} = \text{weight} \times \text{Ref}_{old} + (1 - \text{weigh}) \times \text{Vis}_{cur},$$

where $\text{Ref}_{old}$ represents the background reference image of the frame preceding the target frame, or is an accumulated frame corresponding to frames preceding the target frame. $\text{Vis}_{cur}$ indicates a currently acquired color image, that is, a target frame, and weight indicates an accumulated weight. When the accumulated weight is larger, a background signal-to-noise ratio of the background reference image is higher, and motion blur is more obvious. The image fusion model can better suppress the motion blur problem. Therefore, the accumulated weight can be set to a higher value to produce a better effect on background improvement. For example, the accumulated weight is set to 0.9.

Generating the background reference image in a recursive manner can reduce image buffering and reduce storage pressure.

Although motion blur exists in a foreground area in the background reference image obtained by accumulating frames, a good complementary effect exists between the first background reference image and the first infrared image, and picture quality of the foreground area is not affected.

Optionally, the long exposure frame preceding the to-be-processed color image is used as the background reference image. The long exposure frame is a frame obtained when exposure duration is greater than a third threshold.

In another example, the background reference image is a background reference image of a frame preceding the to-be-processed color image.

In this way, a feature of the previous background reference image can be reused, thereby reducing a calculation amount.

In another example, the to-be-processed color image may be understood as a target frame, and the fused image of the previous frame of the target frame is used as the background reference image of the target frame. That is, the processing result that is of the previous frame of the target frame and is outputted by the image fusion model is used as the background reference image of the target frame.

For example, a frame A is inputted into the image fusion model as the to-be-processed color image to obtain a fused frame A, the fused frame A is used as a background reference image of the frame A+1, and then the frame A+1 and the fused frame A are respectively inputted into the image fusion model as the to-be-processed color image and the background reference image of the frame A+1.

In another example, a result obtained after temporal noise reduction is performed on the to-be-processed color image is used as the background reference image.

In most surveillance scenarios, the background seldom changes, and background parts of pictures are highly similar. For a scenario in which a location of a surveillance device remains unchanged, a color image shot in a case of high illumination may be used as a background reference image. For example, a color image shot in daytime with clear weather is used as a background reference image of a color image shot at night.

The foregoing is merely an example. For another obtaining manner, refer to step S810 in the foregoing method 800. It should be understood that the foregoing manner of obtaining the background reference image is merely an example. This is not limited in this application.

S1120: Input the to-be-processed color image, the infrared image, and the background reference image, into an image fusion model for feature extraction, and perform image fusion based on extracted features to obtain a fused image.

For example, for the image fusion model, refer to step S820 in the method 800.

For example, as shown in FIG. 13, the background reference image is inputted into an encoder 11 #(an example of the first encoder) in the fusion model, and the encoder 11 #extracts the feature of the background reference image, and inputs the feature into a decoder 12 #. The color image and the infrared image are inputted into the encoder 13 #(an example of the second encoder, or may be understood as an example of the third encoder), and the encoder 13 #extracts the features of the inputted color image and the inputted infrared image, and inputs the features into the decoder 12 #. The decoder 12 #reconstructs the fused image based on the input features. Each of the encoder 11 #, the encoder 13 #, and the decoder 12 #may be a convolutional neural network. For example, the inputted color image may be a to-be-processed color image, and the inputted infrared image may be an infrared image.

Optionally, the method 1100 may be applied to a video mode, that is, applied to a video fusion scenario.

Further, a feature of a background reference image of a previous frame of the to-be-processed color image may be used as a feature of the background reference image. In other words, a feature of one frame of background reference image is reused in an image fusion process of a plurality of frames of color images.

For example, the frame A, a background reference image A, and an infrared image A are inputted into the image fusion model, features of the frame A, the background reference image A, and the infrared image A are separately extracted, and then a fused image, that is, a fusion result corresponding to the frame A, is obtained through reconstruction based on the extracted features. The frame A+1 and an infrared image A+1 are inputted into the image fusion model, features of the frame A+1 and the infrared image A+1 are separately extracted, the feature of the background reference image A is used as a feature of the background reference image of the frame A+1, and then a fused image, that is, a fusion result corresponding to the frame A+1, is obtained through reconstruction based on the extracted features.

In this way, it is not necessary to extract a feature of a background reference image in each fusion process. Therefore, a calculation amount is reduced, hardware overheads can be reduced while imaging quality is ensured, and image fusion can still be implemented when computing resources of a device are limited.

For example, the encoder network includes M first encoders and N second encoders, and the decoder network includes N decoders. That is, the image fusion model includes M first encoders, N second encoders, and N decoders. M is a positive integer, N is a positive integer greater than 1, and N>M.

The to-be-processed color image may include N frames of color images, and the infrared image includes N frames of infrared images corresponding to the N frames of color images.

For example, the N frames of infrared images corresponding to the N frames of color images may be obtained when a same region is shot at a same moment as the N frames of color images. In other words, the N frames of color images are in a one-to-one correspondence with the N frames of infrared images.

Optionally, step S1120 includes the following steps.

(1) Features of the N frames of color images and features of the N frames of infrared images are separately extracted.

For example, the N frames of color images and the N frames of infrared images are respectively inputted into the N second encoders, and the N second encoders respectively extract the features of the N frames of color images and the features of the N frames of infrared images, and respectively input the features of the N frames of color images and the features of the N frames of infrared images into the N decoders.

(2) Features of the M background reference images are separately extracted.

For example, the M background reference images corresponding to the M frames of color images in the N frames of color images are respectively inputted into the M first encoders, and the M first encoders respectively extract features of the M background reference images, and respectively input the features of the M background reference images into the N decoders, so that each decoder receives a feature of one of the M background reference images.

(3) N fused images are separately reconstructed based on the features of the N frames of color images, the features of the N frames of infrared images, and the features of the M background reference images.

For example, the N decoders separately obtain the N fused images by means of reconstruction based on features inputted into the N decoders. The features inputted into the N decoders include features of the N frames of color images, features of the N frames of infrared images, and features of the M background reference images.

For example, for each decoder, a color image whose quantity of frames is closest to that of a color image received by the decoder is selected from the M frames of color images, and a background reference image corresponding to the closest color image is inputted into the decoder.

For example, for the decoder A, the feature inputted into the decoder A is the feature of the frame A and the feature of the infrared image corresponding to the frame A. If the frame A is one of the M frames of color images, the feature of the background reference image of the frame A is inputted into the decoder A. If the frame A does not belong to the M frames of color images, a feature of a background reference image of a color image that is in the M frames of color images and whose quantity of frames is closest to that of the frame A is inputted into the decoder A.

For example, as shown in FIG. 14, the feature of the $i^{th}$ frame of background reference image is reused for image fusion of the $i^{th}$ frame and the $(i+1)^{th}$ frame. In this way, fusion may be performed on the two frames at the same time, thereby improving a processing speed. In addition, features of the background reference image do not need to be extracted twice, thereby reducing a calculation amount. When an effect is basically lossless, overheads of the solution can be reduced by 25%.

It may be understood that the method 800 is a training phase of the image fusion model, and specific training is performed by using the image fusion model provided in the method 800. The method 1100 may be understood as an application phase of the image fusion model, and may be specifically reflected as obtaining an output image, that is, a fused image in the method 1100, by using the image fusion model obtained through training in the method 800 and based on a to-be-processed color image and an infrared image that are inputted by a user.

It should be noted that, in the method 1100, the image fusion model obtained through training in the method 800 may be used, or the image fusion model obtained through training in the method 800 may not be used.

According to the solution in embodiments of this application, the background reference image is added as an input of the image fusion model, so that a background blur problem that may be caused by a flashlight effect of an infrared image can be resolved, and background quality of an output image can be greatly improved, that is, both foreground area quality and background area quality of the output image are enhanced, to implement full-picture image enhancement.

An embodiment of this application provides an image fusion method 1200, to adjust an output image by increasing a fusion weight, to satisfy different application scenarios.

The method 1200 may be performed by the image fusion apparatus. The image fusion apparatus may be a cloud service device, or may be a terminal device, for example, an apparatus whose computing capability is sufficient to perform the image fusion method, such as a computer or a server, or may be a system including a cloud service device and a terminal device. For example, the method 1200 may be performed by the execution device 110 in FIG. 1, the neural network processor 30 in FIG. 3, the execution device 410 in FIG. 4, or a local device.

For example, the method 1200 may be specifically performed by a local device in FIG. 4, and the local device may be a monitoring device. Specifically, the method 1200 may be performed by a calculation module on the monitoring device.

For example, the image fusion model used in the image fusion method 1200 may be constructed by using the foregoing method 900. The method 1200 includes step S1210 and step S1220. For a specific implementation of the method 1200, refer to the foregoing method 900. To avoid unnecessary repetition, repeated descriptions are properly omitted below when the method 1200 is described.

S1210: Obtain a to-be-processed color image, an infrared image, and a fusion weight.

The fusion weight is for weighting the to-be-processed color image and the infrared image.

In other words, the fusion weight is for adjusting a fusion ratio of the to-be-processed color image and the infrared image in the fused image.

For example, the fusion weight may be in a parameter form, or may be in an image form, that is, a fusion weight map. That is, the fusion weight may be inputted into the image fusion model in a form of a parameter, or may be inputted into the image fusion model in a form of an image.

Optionally, the fusion weight corresponds to all fused images.

That the fusion weight corresponds to all of the fused image may be understood as that only one fusion weight is used in the entire fused image. The fusion ratio of the to-be-processed color image and the infrared image is the same in any area in the fused image. The fusion weight may also be referred to as a global weight.

Optionally, the fusion weight corresponds to a part of the fused image.

That the fusion weight corresponds to a part of the fused image may be understood as that the fusion weight corresponds to one area in the fused image. In this case, a plurality of fusion weights may be used, and the plurality of fusion weights respectively correspond to different areas in the fused image. The fusion weight may also be referred to as a local weight.

For example, the fusion weight is greater than or equal to 0 and less than or equal to 1, and a proportion of the infrared image in the fused image is in a positive correlation with the fusion weight.

In other words, a value range of the fusion weight is [0,1], and the fusion weight may be for indicating a proportion of the infrared image in the fused image. When the fusion weight is larger, the proportion of the infrared image in the fused image is larger, that is, more infrared information is fused in the fused image.

The fusion weight may be obtained in a plurality of manners. The following uses an example to describe a manner of obtaining the fusion weight. The fusion weight may be obtained in any one of the following manners. It should be understood that the following is merely an example, and the fusion weight may alternatively be obtained in another manner. This is not limited in this application.

Manner 1: The fusion weight may be preset. For example, the fusion weight may be manually set.

Manner 2: The fusion weight is determined based on the intensity of the infrared image.

For example, the plurality of fusion weights are determined based on luminance values of different areas of the infrared image. Specifically, an area with higher luminance in the infrared image corresponds to a higher fusion weight. Because an area with higher luminance has a higher signal-to-noise ratio, a weight value may be adaptively adjusted based on the intensity of the infrared image, and a higher weight is set in an area with higher luminance, which helps improve quality of the fused image.

Manner 3: The fusion weight is determined based on information entropy of the to-be-processed color image and information entropy of the infrared image.

The plurality of fusion weights are determined based on the information entropy of the to-be-processed color image and the information entropy of the infrared image.

For example, if information entropy at an area A of the infrared image is greater than information entropy at an area A of the to-be-processed color image, a weight value corresponding to the infrared image at the area A is high. If information entropy at an area B of the infrared image is less than information entropy at an area B of the to-be-processed color image, a weight value corresponding to the infrared image at the area B is low.

An information entropy source includes but is not limited to gradient information, contrast information, and the like.

Generally, when information entropy of an image is larger, an image is clearer. A weight value is adaptively adjusted by using the information entropy of the image, to obtain a fusion weight, so that an area with higher information entropy corresponds to a larger weight, thereby helping improve quality of the fused image.

Manner 4: The fusion weight is determined based on human face information.

For example, a large weight value of the infrared image may be set at a human face area, and a small weight value of the infrared image is set at another area other than the human face area, that is, a weight value of the to-be-processed color image is high.

A manner of obtaining the human face area includes but is not limited to a manner such as human face detection, image segmentation, or a human face heatmap.

The infrared image includes more image information, that is, includes more texture information. Therefore, a large weight value of the infrared image is set at the human face area, more infrared information can be fused in the human face area, and more details can be retained, thereby improving the definition of the human face area and helping improve accuracy of facial recognition. A to-be-processed color image has more realistic color. Therefore, a small weight value of the to-be-processed infrared image is set in another area, so that more color information can be fused in the another area, a natural degree of color in the another area is ensured, and an effect of the fused image is more natural.

For example, as shown in FIG. 15, a human face area in (a) of FIG. 15 is obtained, and a weight fused image is generated based on the human face area, as shown in (b) of FIG. 15. A weight of the human face area is greater than those of other areas. The weight value is for indicating a proportion of the infrared image in the fused image. A weight of a human face area in (b) of FIG. 15 is 0.6, and weights of other areas are 0.1.

For example, the human face area may be a human face box, for example, a rectangular box in FIG. 15. Alternatively, the human face box may be of another shape, for example, a circular box or an irregular box.

The image used for human face detection may be a to-be-processed color image, or may be an infrared image. Human face detection may be performed on a color image to obtain a human face box, or human face detection may be performed on an infrared image to obtain a human face box. For example, (a) of FIG. 15 shows human face detection performed on an infrared image.

It should be understood that, in FIG. 15, that the fusion weight is represented only in a form of a fusion weight map is used as an example, and does not constitute a limitation on the solution in embodiments of this application. The fusion weight may alternatively be represented in another form, for example, the fusion weight is represented in a form of a parameter value.

It should be noted that in FIG. 15, only an example in which the fusion weight indicates a weight value of the infrared image is used for description, and does not constitute a limitation on the solution in embodiments of this application. The fusion weight may be further used to indicate a weight value of a color image, or the like.

The foregoing is merely an example. For another obtaining manner, refer to step S910 in the foregoing method 900. It should be understood that the foregoing manner of obtaining the fusion weight is merely an example. This is not limited in this application.

S1220: Input the to-be-processed color image, the infrared image, and the fusion weight into the image fusion model for feature extraction, and perform image fusion based on extracted features to obtain a fused image.

The image fusion model may be trained by using the method 900 to obtain the image fusion model.

FIG. 17 shows a fused image obtained by using different fusion weights. In (a) of FIG. 17, a global weight is used, and a weight value corresponding to an infrared image is 0.1. The fused image is similar to performing noise reduction on a color image. There is little fused infrared information, and definition of an image is low, especially a human face area is blurry. In (b) of FIG. 17, a global weight is used. A weight value corresponding to an infrared image is 0.6. Definition of the fused image is high, and definition of a human face area is improved, which facilitates subsequent processing such as facial recognition. However, as shown by arrows in the figure, there is a large amount of texture information fused in the human body area, resulting in heavy oil painting quality in the human body area and a low natural degree of the image. In (c) of FIG. 17, a fusion weight shown in (b) of FIG. 15, that is, a weight value corresponding to an infrared image in a human face area is 0.6, and a weight value corresponding to an infrared image in another area is 0.1. The human face definition of the fused image is high, and the natural degree of other areas is ensured.

It may be understood that the method 900 is a training phase of the image fusion model, and specific training is performed by using the image fusion model provided in the method 900. The method 1200 may be understood as an application phase of the image fusion model, and may be specifically reflected as obtaining an output image, that is, a fused image in the method 1200, by using the image fusion model obtained through training in the method 900 and based on a to-be-processed color image and an infrared image that are inputted by a user.

It should be noted that, in the method 1200, the image fusion model obtained through training in the method 900 may be used, or the image fusion model obtained through training in the method 900 may not be used.

For example, the method 1100 and the method 1200 may be used in combination. To be specific, the fusion weight, the infrared image, the to-be-processed color image, and the background reference image are inputted into the image fusion model for image fusion, to obtain the fused image. For example, by using the image fusion model in FIG. 13, the fusion weight map, the infrared image, and the to-be-processed color image are inputted into the second encoder, and the background reference image is inputted into the first encoder, to perform image fusion.

A fused image obtained by performing fusion using a same image fusion model cannot satisfy fusion requirements of different application scenarios. According to the solution in embodiments of this application, a fusion weight is introduced, and a fusion ratio of a color image and an infrared image can be adjusted by adjusting the fusion weight. This helps the application to different application scenarios. In other words, it is not necessary to separately train a plurality of image fusion models for different application scenarios, and one image fusion model can be applied to different scenarios only by adjusting a fusion weight, thereby improving freedom of using the model.

In addition, according to the solution in embodiments of this application, different areas correspond to different fusion weights, to satisfy image fusion requirements of different areas in a same image, thereby helping improve image quality of an output image.

The following describes apparatuses in embodiments of this application with reference to FIG. 20 to FIG. 23. It should be understood that the apparatuses described below can perform the methods in the foregoing embodiments of this application. To avoid unnecessary repetition, repeated descriptions are properly omitted below when the apparatuses in embodiments of this application are described.

Figure 20:
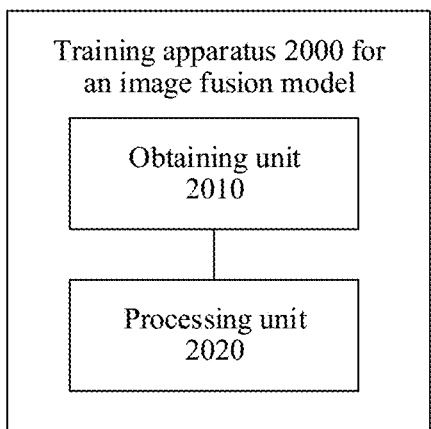
FIG. 20 is a schematic block diagram of a training apparatus for an image fusion model according to an embodiment of this application.

FIG. 20 is a schematic block diagram of a training apparatus for an image fusion model according to an embodiment of this application. The training apparatus 2000 for an image fusion model shown in FIG. 20 includes an obtaining unit 2010 and a processing unit 2020.

The obtaining unit 2010 and the processing unit 2020 may be configured to perform the training method 700, method 800, or method 900 for an image fusion model in embodiments of this application.

For example, the obtaining unit 2010 is configured to: obtain at least one training sample, where the training sample includes a first color image, a first infrared image, a target color image, and a target infrared image, the first color image, the first infrared image, the target color image, and the target infrared image are shot for a same scene, the same scene means that a similarity between any two of the first color image, the first infrared image, the target color image, and the target infrared image is greater than a first threshold, the first color image and the target color image are images formed by reflection of visible light by the scene, and the first infrared image and the target infrared image are images formed by reflection of light in an infrared band by the scene; and a signal-to-noise ratio of the target color image is greater than a signal-to-noise ratio of the first color image, and a signal-to-noise ratio of the target infrared image is greater than a signal-to-noise ratio of the first infrared image. The processing unit 2020 is configured to train an image fusion model using the first color image and the first infrared image as inputs of the image fusion model and using a target that a value of a loss function is less than a fourth threshold, to obtain a trained image fusion model, where the loss function includes a first loss function, the first loss function is for indicating a difference between an image outputted by the image fusion model and a target fused image, and the target fused image is determined based on the target color image and the target infrared image.

Optionally, in an embodiment, the processing unit 2020 is specifically configured to: train the image fusion model using a first fusion weight, the first color image, and the first infrared image as inputs of the image fusion model and using the target that the value of the loss function is less than the fourth threshold, to obtain the trained image fusion model, where the first fusion weight is for weighting the first color image and the first infrared image, and the target fused image is determined based on the first fusion weight, the target color image, and the target infrared image.

Optionally, in an embodiment, the first fusion weight corresponds to a part or all of the image outputted by the image fusion model.

Optionally, in an embodiment, the processing unit 2020 is further configured to train the image fusion model using a first background reference image, the first color image, and the first infrared image as inputs of the image fusion model and using the target that the value of the loss function is less than the fourth threshold, to obtain the trained image fusion model, where a similarity between the first background reference image and the first color image is greater than a second threshold.

Optionally, in an embodiment, the loss function further includes a second loss function, and the second loss function is for indicating a difference between the target color image and the image outputted by the image fusion model.

Optionally, in an embodiment, the target fused image is an image of a luminance channel, and the difference between the image outputted by the image fusion model and the target fused image is a difference between a luminance channel of the image outputted by the image fusion model and the target fused image.

Figure 21:
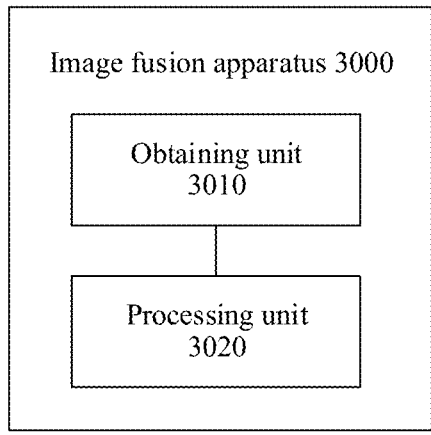
FIG. 21 is a schematic block diagram of an image fusion apparatus according to an embodiment of this application.

FIG. 21 is a schematic block diagram of an image fusion apparatus according to an embodiment of this application. The image fusion apparatus 3000 shown in FIG. 21 includes an obtaining unit 3010 and a processing unit 3020.

The obtaining unit 3010 and the processing unit 3020 may be configured to perform the image fusion method 1000, method 1100, or method 1200 in embodiments of this application.

For example, the obtaining unit 3010 is configured to obtain a to-be-processed color image, an infrared image, and a background reference image, where the infrared image and the to-be-processed color image are shot for a same scene, and the same scene means that a similarity between the to-be-processed color image and the infrared image is greater than a first threshold; and the to-be-processed color image is an image formed by reflection of visible light by the scene, and the infrared image is an image formed by reflection of light in an infrared band by the scene. The processing unit 3020 is configured to: input the to-be-processed color image, the infrared image, and the background reference image into a trained image fusion model for feature extraction, and perform image fusion based on extracted features to obtain a fused image, where a similarity between the background reference image and the to-be-processed color image is greater than a second threshold.

Optionally, in an embodiment, the processing unit 3020 is further configured to: obtain a fusion weight, and input the fusion weight into the image fusion model, where the fusion weight is for weighting the to-be-processed color image and the infrared image.

Optionally, in an embodiment, the fusion weight corresponds to a part or all of the fused image.

Optionally, in an embodiment, the to-be-processed color image includes N frames of color images, the infrared image includes N frames of infrared images corresponding to the N frames of color images, background reference images corresponding to the N frames of color images are determined based on background reference images of M frames of color images in the N frames of color images, M is a positive integer, N is a positive integer greater than 1, and N>M.

Optionally, in an embodiment, the image fusion model includes M first encoders, N second encoders, and N decoders, and the processing unit 3020 is specifically configured to: separately extract features of the N frames of color images and features of the N frames of infrared images; separately extract features of M background reference images corresponding to the M frames of color images; and separately reconstruct N fused images based on the features of the N frames of color images, the features of the N frames of infrared images, and the features of the M background reference images.

Optionally, in an embodiment, the background reference image is obtained in any one of the following manners: obtaining the background reference image based on a plurality of frames preceding the to-be-processed color image; using a long exposure frame preceding the to-be-processed color image as the background reference image, where the long exposure frame is a frame obtained when exposure duration is greater than a third threshold; using a result obtained after temporal noise reduction is performed on the to-be-processed color image as the background reference image; or using a fused image of frames preceding the to-be-processed color image as the background reference image.

Optionally, in an embodiment, the trained image fusion model is obtained by training an image fusion model using a first color image and a first infrared image as inputs of the image fusion model and using a target that a value of a loss function is less than a fourth threshold; and the loss function includes a first loss function, the first loss function is for indicating a difference between an image outputted by the image fusion model and a target fused image, the target fused image is determined based on a target color image and a target infrared image, the first color image, the first infrared image, the target color image, and the target infrared image are shot for the same scene, the same scene means that a similarity between any two of the first color image, the first infrared image, the target color image, and the target infrared image is greater than the first threshold, a signal-to-noise ratio of the target color image is greater than a signal-to-noise ratio of the first color image, and a signal-to-noise ratio of the target infrared image is greater than a signal-to-noise ratio of the first infrared image.

Optionally, in an embodiment, the loss function further includes a second loss function, and the second loss function is for indicating a difference between the target color image and the image outputted by the image fusion model.

Optionally, in an embodiment, the target fused image is an image of a luminance channel, and the difference between the image outputted by the image fusion model and the target fused image is a difference between a luminance channel of the image outputted by the image fusion model and the target fused image.

It should be noted that the apparatus 2000 and the apparatus 3000 are embodied in a form of functional units. The term "unit" herein may be implemented in a form of software and/or hardware. This is not specifically limited.

For example, the "unit" may be a software program, a hardware circuit, or a combination thereof for implementing the foregoing function. The term "unit" herein may include an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function.

Therefore, the units in the examples described in embodiments of this application can be implemented by using electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Figure 22:
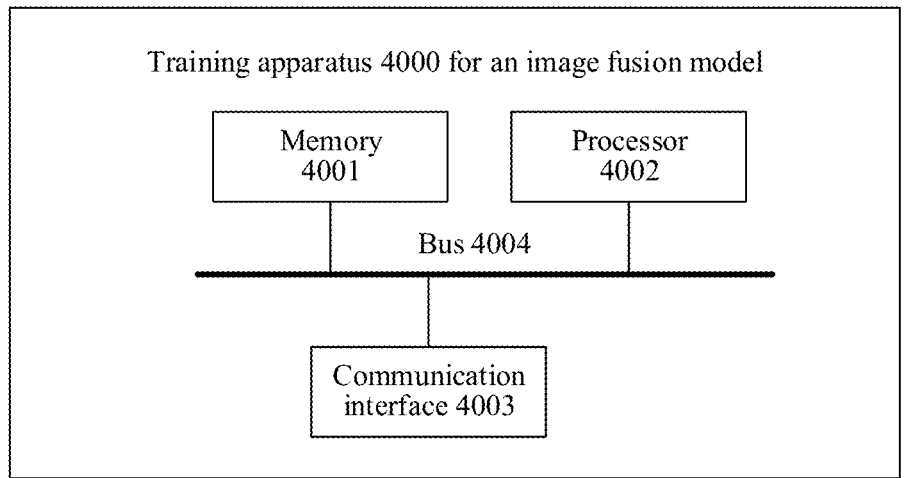
FIG. 22 is a schematic block diagram of a training apparatus for an image fusion model according to an embodiment of this application.

FIG. 22 is a schematic diagram of a hardware structure of a training apparatus for an image fusion model according to an embodiment of this application. The training apparatus 4000 for an image fusion model (the apparatus 4000 may be specifically a computer device) shown in FIG. 22 includes a memory 4001, a processor 4002, a communication interface 4003, and a bus 4004. Communication connections between the memory 4001, the processor 4002, and the communication interface 4003 are implemented through the bus 4004.

The memory 4001 may be a read-only memory (ROM), a static storage device, a dynamic storage device, or a random access memory (RAM). The memory 4001 may store a program. When the program stored in the memory 4001 is executed by the processor 4002, the processor 4002 and the communication interface 4003 are configured to perform the steps of the training method for an image fusion model in embodiments of this application. Specifically, the processor 4002 may perform the foregoing method 700, method 800, or method 900.

The processor 4002 may be a general-purpose central processing unit (CPU), a microprocessor, an application-specific integrated circuit (ASIC), a graphics processing unit, or one or more integrated circuits, and is configured to execute a related program, to implement a function that needs to be performed by a unit in the training apparatus for an image fusion model in embodiments of this application, or perform the training method for an image fusion model in the method embodiments of this application.

The processor 4002 may be an integrated circuit chip and has a signal processing capability, for example, may be the chip shown in FIG. 3. In an embodiment process, steps of the training method for an image fusion model in this application may be implemented by using an integrated logic circuit of hardware in the processor 4002, or by using instructions in a form of software.

The foregoing processor 4002 may be a general purpose processor, a digital signal processor (digital signal processing, DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory 4001. The processor 4002 reads information in the memory 4001, and completes, in combination with hardware of the processor 4002, functions that need to be performed by units included in the training apparatus for an image fusion model in embodiments of this application, or performs the training method for an image fusion model in the method embodiments of this application.

The communication interface 4003 uses a transceiver apparatus, for example but not for limitation, a transceiver, to implement communication between the apparatus 4000 and another device or a communication network. For example, training data (such as the first color image, the first infrared image, the target color image, and the target infrared image in the method 700) may be obtained by using the communication interface 4003.

The bus 4004 may include a path for transmitting information between the components (for example, the memory 4001, the processor 4002, and the communication interface 4003) of the apparatus 4000.

It should be understood that the obtaining unit 2010 in the training apparatus 2000 for an image fusion model is equivalent to the communication interface 4003 in the training apparatus 4000 for an image fusion model, and the processing unit 2020 may be equivalent to the processor 4002.

Figure 23:
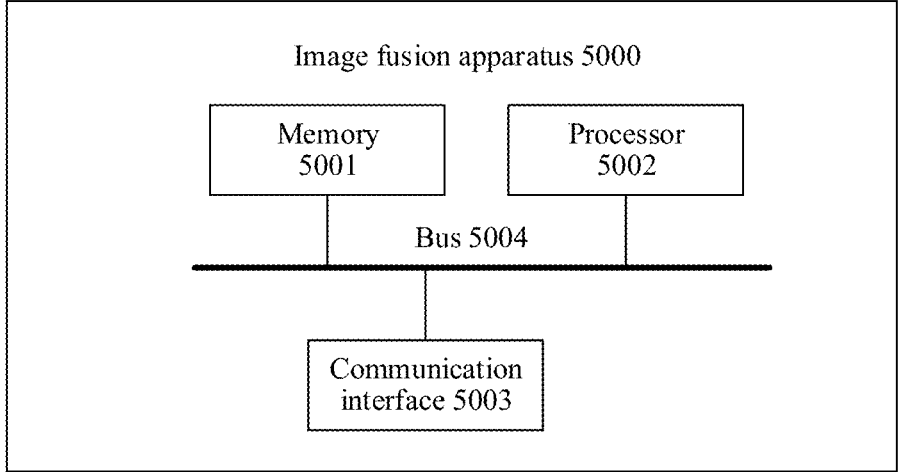
FIG. 23 is a schematic block diagram of an image fusion apparatus according to an embodiment of this application.

FIG. 23 is a schematic diagram of a hardware structure of an image fusion apparatus according to an embodiment of this application. The image fusion apparatus 5000 (the apparatus 5000 may be specifically a computer device) shown in FIG. 23 includes a memory 5001, a processor 5002, a communication interface 5003, and a bus 5004. Communication connections between the memory 5001, the processor 5002, and the communication interface 5003 are implemented through the bus 5004.

The memory 5001 may be a ROM, a static storage device, a dynamic storage device, or a RAM. The memory 5001 may store a program. When the program stored in the memory 5001 is executed by the processor 5002, the processor 5002 and the communication interface 5003 are configured to perform the steps of the image fusion method in embodiments of this application.

The processor 5002 may be a general-purpose CPU, a microprocessor, an ASIC, a GPU, or one or more integrated circuits, and is configured to execute a related program, to implement functions that need to be performed by units in the image fusion apparatus in embodiments of this application, or perform the image fusion method in the method embodiments of this application.

The processor 5002 may be an integrated circuit chip and has a signal processing capability. In an embodiment process, steps of the image fusion method in this application may be implemented by using an integrated logic circuit of hardware in the processor 5002, or by using instructions in a form of software. The foregoing processor 5002 may be a general purpose processor, a DSP, an ASIC, an FPGA or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory 5001. The processor 5002 reads information in the memory 5001, and completes, in combination with hardware of the processor 5002, functions that need to be performed by units included in the image fusion apparatus in embodiments of this application, or performs the image fusion method in method embodiments of this application.

The communication interface 5003 uses a transceiver apparatus, for example, but not limited to, a transceiver, to implement communication between the apparatus 5000 and another device or a communication network. For example, input data (for example, a to-be-processed color image and an infrared image in embodiments of this application) may be obtained by using the communication interface 5003.

The bus 5004 may include a path for information transfer between various components (for example, the memory 5001, the processor 5002, and the communication interface 5003) of the apparatus 5000.

It should be understood that the obtaining unit 3010 in the image fusion apparatus 3000 is equivalent to the communication interface 5003 in the image fusion apparatus 5000, and the processing unit 3020 in the image fusion apparatus 3000 may be equivalent to the processor 5002.

It should be noted that although only the memory, the processor, and the communication interface are shown in the apparatuses 4000 and 5000 shown in FIG. 22 and FIG. 23, in a specific implementation process, a person skilled in the art should understand that the apparatuses 4000 and 5000 further include other components required for implementing normal running. In addition, according to a specific requirement, a person skilled in the art should understand that the apparatus 4000 and 5000 may further include hardware components for implementing other additional functions. In addition, a person skilled in the art should understand that the apparatuses 4000 and 5000 may include only components necessary for implementing embodiments of this application, and do not need to include all the components shown in FIG. 22 or FIG. 23.

It may be understood that the apparatus 4000 is equivalent to the training device 120 in FIG. 1, and the apparatus 5000 is equivalent to the execution device 110 in FIG. 1. A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a universal serial bus flash disk (USB flash disk, UFD), a removable hard disk, a read-only memory (ROM), a random access memory (RAM), a magnetic disk, or a compact disc. The UFD may also be briefly referred to as a USB flash drive or a USB flash drive.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image fusion method, comprising:
obtaining a to-be-processed color image, an infrared image, and a background reference image, wherein the infrared image and the to-be-processed color image are shot for a same scene, wherein a similarity between the to-be-processed color image and the infrared image is greater than a first threshold; and the to-be-processed color image is an image formed by reflection of visible light by the scene, the infrared image is an image formed by reflection of light in an infrared band by the scene, and a similarity between the background reference image and the to-be-processed color image is greater than a second threshold, wherein the to-be-processed color image comprises N frames of color images, the infrared image comprises N frames of infrared images corresponding to the N frames of color images, background reference images corresponding to the N frames of color images are determined based on background reference images of M frames of color images in the N frames of color images, M is a positive integer, N is a positive integer greater than 1, and N>M; and
inputting the to-be-processed color image, the infrared image, and the background reference image into a trained image fusion model to obtain extracted features; and
performing image fusion based on the extracted features to obtain a fused image.

2. The method according to claim 1, wherein the method further comprises:
obtaining a fusion weight; and
inputting the fusion weight into the trained image fusion model, wherein the fusion weight is for weighting the to-be-processed color image and the infrared image.

3. The method according to claim 2, wherein the fusion weight corresponds to a part or all of the fused image.

4. The method according to claim 1, wherein the inputting the to-be-processed color image, the infrared image, and the background reference image into a trained image fusion model for feature extraction, and performing image fusion based on the extracted features to obtain a fused image comprises:
separately extracting features of the N frames of color images and features of the N frames of infrared images;
separately extracting features of M background reference images corresponding to the M frames of color images; and
separately reconstructing N fused images based on the features of the N frames of color images, the features of the N frames of infrared images, and the features of the M background reference images.

5. The method according to claim 1, wherein the background reference image is obtained in any one of the following manners:
obtaining the background reference image based on a plurality of frames preceding the to-be-processed color image;

using a long exposure frame preceding the to-be-processed color image as the background reference image, wherein the long exposure frame is a frame obtained when exposure duration is greater than a third threshold;

using a result obtained after temporal noise reduction is performed on the to-be-processed color image as the background reference image; or using a fused image of frames preceding the to-be-processed color image as the background reference image.

6. The method according to claim 1, wherein the trained image fusion model is obtained by training an image fusion model using a first color image and a first infrared image as inputs of the image fusion model and using a target that a value of a loss function is less than a fourth threshold; and the loss function comprises a first loss function, the first loss function is for indicating a difference between an image outputted by the image fusion model and a target fused image, the target fused image is determined based on a target color image and a target infrared image, the first color image, the first infrared image, the target color image, and the target infrared image are shot for the same scene, wherein a similarity between any two of the first color image, the first infrared image, the target color image, and the target infrared image is greater than the first threshold, a signal-to-noise ratio of the target color image is greater than a signal-to-noise ratio of the first color image, and a signal-to-noise ratio of the target infrared image is greater than a signal-to-noise ratio of the first infrared image.

7. The method according to claim 6, wherein the loss function further comprises a second loss function, and the second loss function is for indicating a difference between the target color image and the image outputted by the image fusion model.

8. The method according to claim 6, wherein the target fused image is an image of a luminance channel, and the difference between the image outputted by the image fusion model and the target fused image is a difference between a luminance channel of the image outputted by the image fusion model and the target fused image.

9. A training method for an image fusion model, comprising:

obtaining at least one training sample, wherein the training sample comprises a first color image, a first infrared image, a target color image, and a target infrared image, the first color image, the first infrared image, the target color image, and the target infrared image are shot for a same scene, wherein a similarity between any two of the first color image, the first infrared image, the target color image, and the target infrared image is greater than a first threshold, the first color image and the target color image are images formed by reflection of visible light by the scene, and the first infrared image and the target infrared image are images formed by reflection of light in an infrared band by the scene; and a signal-to-noise ratio of the target color image is greater than a signal-to-noise ratio of the first color image, and a signal-to-noise ratio of the target infrared image is greater than a signal-to-noise ratio of the first infrared image; and training an image fusion model using the first color image and the first infrared image as inputs of the image fusion model and using a target that a value of a loss function is less than a fourth threshold, to obtain a trained image fusion model, wherein the loss function comprises a first loss function, the first loss function is for indicating a difference between an image outputted by the image fusion model and a target fused image, and the target fused image is determined based on the target color image and the target infrared image.

10. The method according to claim 9, wherein the training an image fusion model using the first color image and the first infrared image as inputs of the image fusion model and using a target that a value of a loss function is less than a fourth threshold, to obtain a trained image fusion model comprises:

training the image fusion model using a first fusion weight, the first color image, and the first infrared image as inputs of the image fusion model and using the target that the value of the loss function is less than the fourth threshold, to obtain the trained image fusion model, wherein the first fusion weight is for weighting the first color image and the first infrared image, and the target fused image is determined based on the first fusion weight, the target color image, and the target infrared image.

11. The method according to claim 10, wherein the first fusion weight corresponds to a part or all of the image outputted by the image fusion model.

12. The method according to claim 9, wherein the training an image fusion model using the first color image and the first infrared image as inputs of the image fusion model and using a target that a value of a loss function is less than a fourth threshold, to obtain a trained image fusion model comprises:

training the image fusion model using a first background reference image, the first color image, and the first infrared image as inputs of the image fusion model and using the target that the value of the loss function is less than the fourth threshold, to obtain the trained image fusion model, wherein a similarity between the first background reference image and the first color image is greater than a second threshold.

13. The method according to claim 9, wherein the loss function further comprises a second loss function, and the second loss function is for indicating a difference between the target color image and the image outputted by the image fusion model.

14. The method according to claim 9, wherein the target fused image is an image of a luminance channel, and the difference between the image outputted by the image fusion model and the target fused image is a difference between a luminance channel of the image outputted by the image fusion model and the target fused image.

15. An electronic device, wherein the electronic device comprises a processor and a memory, the processor is coupled to the memory, the memory comprises instructions, and when the instructions are executed by the device, the device is enabled to perform the following operations:

obtaining a to-be-processed color image, an infrared image, and a background reference image, wherein the infrared image and the to-be-processed color image are shot for a same scene, wherein a similarity between the to-be-processed color image and the infrared image is greater than a first threshold; and the to-be-processed color image is an image formed by reflection of visible light by the scene, the infrared image is an image formed by reflection of light in an infrared band by the scene, and a similarity between the background reference image and the to-be-processed color image is greater than a second threshold, wherein the to-beprocessed color image comprises N frames of color images, the infrared image comprises N frames of infrared images corresponding to the N frames of color images, background reference images corresponding to the N frames of color images are determined based on background reference images of M frames of color images in the N frames of color images, M is a positive integer, N is a positive integer greater than 1, and N>M;

inputting the to-be-processed color image, the infrared image, and the background reference image into a trained image fusion model to obtain extracted features; and performing image fusion based on the extracted features to obtain a fused image.

16. The device according to claim 15, wherein the operations further comprises:

obtaining a fusion weight; and inputting the fusion weight into the trained image fusion model, wherein the fusion weight is for weighting the to-be-processed color image and the infrared image.

17. The device according to claim 15, wherein the inputting the to-be-processed color image, the infrared image, and the background reference image into a trained image fusion model to obtain extracted features, and performing image fusion based on the extracted features to obtain a fused image comprises:

separately extracting features of the N frames of color images and features of the N frames of infrared images;

separately extracting features of M background reference images corresponding to the M frames of color images; and separately reconstructing N fused images based on the features of the N frames of color images, the features of the N frames of infrared images, and the features of the M background reference images.

18. The device according to claim 15, wherein the background reference image is obtained in any one of the following manners:

obtaining the background reference image based on a plurality of frames preceding the to-be-processed color image;

using a long exposure frame preceding the to-be-processed color image as the background reference image, wherein the long exposure frame is a frame obtained when exposure duration is greater than a third threshold;

using a result obtained after temporal noise reduction is performed on the to-be-processed color image as the background reference image; or using a fused image of frames preceding the to-be-processed color image as the background reference image.

* * * * *